United States Patent
Iwata et al.

(10) Patent No.: US 10,317,750 B2
(45) Date of Patent: Jun. 11, 2019

(54) LIQUID CRYSTAL DISPLAY DEVICE

(71) Applicant: SHARP KABUSHIKI KAISHA, Sakai, Osaka (JP)

(72) Inventors: Yosuke Iwata, Sakai (JP); Mitsuhiro Murata, Sakai (JP); Satoshi Matsumura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/741,247

(22) PCT Filed: Jun. 27, 2016

(86) PCT No.: PCT/JP2016/068940
§ 371 (c)(1),
(2) Date: Dec. 30, 2017

(87) PCT Pub. No.: WO2017/006789
PCT Pub. Date: Jan. 12, 2017

(65) Prior Publication Data
US 2018/0188613 A1    Jul. 5, 2018

(30) Foreign Application Priority Data
Jul. 3, 2015    (JP) .................................. 2015-134562

(51) Int. Cl.
*G02F 1/1343*    (2006.01)

(52) U.S. Cl.
CPC .. *G02F 1/134309* (2013.01); *G02F 1/134363* (2013.01); *G02F 2001/134318* (2013.01); *G02F 2201/40* (2013.01)

(58) Field of Classification Search
None
See application file for complete search history.

(56) References Cited

U.S. PATENT DOCUMENTS

| 6,094,249 A * | 7/2000 | Robinson .......... G02F 1/134309 |
| | | 349/141 |
| 2002/0021396 A1* | 2/2002 | Yoo ................... G02F 1/133707 |
| | | 349/141 |
| 2002/0041354 A1 | 4/2002 | Noh et al. |
| | (Continued) | |

FOREIGN PATENT DOCUMENTS

JP    2002-182230 A    6/2002

*Primary Examiner* — Richard H Kim
(74) *Attorney, Agent, or Firm* — ScienBiziP, P.C.

(57) ABSTRACT

In the present invention, a liquid crystal display device capable of achieving a high contrast ratio and a wide viewing angle, and capable of achieving a high-speed response is provided. The liquid crystal display device in the present invention is configured such that, when viewed in a plan view, at least one contour line of a plurality of linear portions of a first electrode intersects with a branch portion of a second electrode and a branch portion of a third electrode adjacent to each other, a length of a part intersecting with the branch portion of the third electrode is longer than a length of a part intersecting with the branch portion of the second electrode, and a driving operation is performed such that a potential difference between the first electrode and the third electrode is equal to or greater than a potential difference between the first electrode and the second electrode.

10 Claims, 14 Drawing Sheets

(56) References Cited

U.S. PATENT DOCUMENTS

2009/0224245 A1\* 9/2009 Umezaki ............... G11C 19/28
　　　　　　　　　　　　　　　　　　　　　　257/59
2013/0033666 A1\* 2/2013 Chung ............. G02F 1/133707
　　　　　　　　　　　　　　　　　　　　　　349/126

\* cited by examiner

LIQUID CRYSTAL DISPLAY DEVICE

TECHNICAL FIELD

The present invention relates to liquid crystal display devices. More specifically, the present invention relates to a liquid crystal display device that performs display by applying an electric field by using a plurality of electrodes.

BACKGROUND ART

Liquid crystal display devices are configured by holding a liquid crystal display element between a pair of glass substrates or the like. The liquid crystal display devices are indispensable for daily life and business, such as car navigation systems, electronic books, digital photo frames, industrial equipment, televisions, personal computers, smartphones, tablet terminals, or the like, by taking advantages of a low profile, lightweight, and low power consumption. In these applications, various modes of liquid crystal display devices relating to an electrode arrangement or a substrate design for changing optical characteristics of the liquid crystal layer are studied.

Display schemes of liquid crystal display devices in recent years include a Vertical Alignment (VA) mode such as a Multi-domain Vertical Alignment (MVA) mode or the like, in which liquid crystal molecules having negative anisotropy of dielectric constant are vertically aligned with respect to the substrate surface, an In-Plane Switching (IPS) mode, in which liquid crystal molecules having positive or negative anisotropy of dielectric constant are horizontally aligned with respect to the substrate surface to apply a transverse electric field to the liquid crystal layer, a Fringe Field Switching (FFS) mode, and the like.

In particular, the FFS mode is a liquid crystal mode frequently used in recent years for smartphones and tablet terminals. As an FFS-mode liquid crystal display device, for example, an FFS-mode liquid crystal display device is disclosed including: a first transparent insulating substrate and a second transparent insulating substrate arranged opposite to each other with a predetermined distance, with a liquid crystal layer including a plurality of liquid crystal molecules interposed between the first and second transparent insulating substrates; a plurality of gate bus lines and data bus lines formed on the first transparent insulating substrate and arranged in a matrix form to define a unit pixel; a thin film transistor formed at an intersection of the gate bus line and the data bus line; a counter electrode disposed in each unit pixel and made of a transparent conductor; and a pixel electrode, made of a transparent conductor, arranged in each unit pixel to generate a fringe field together with the counter electrode, insulated from the counter electrode, and including a plurality of upper slits and a plurality of lower slits symmetrically arranged to each other with respect to a long side of the pixel with a predetermined tilted angle (for example, see PTL 1).

CITATION LIST

Patent Literature

PTL 1: JP 2002-182230 A

SUMMARY OF INVENTION

Technical Problem

PTL 1 discloses the FFS-mode liquid crystal display device having a wide viewing angle characteristic, and improves a low aperture ratio and a transmittance in IPS-mode liquid crystal display devices (for example, see FIG. 6 in PTL 1. FIG. 6 in PTL 1 illustrates a plane pixel structure of the FFS-mode liquid crystal display device). However, the FFS-mode liquid crystal display device disclosed in PTL 1 is capable of forcibly causing the liquid crystal to make a response, by applying an electric field in rise time, but, in fall time, causes the liquid crystal to make a response using only viscoelasticity by stopping the application of the electric field. The response is therefore slower than the vertical alignment mode such as the MVA mode or the like, and hence, there is room for improving the response characteristic.

An example of the FFS-mode liquid crystal display device disclosed in PTL 1 will be described with reference to FIG. 20. FIG. 20 is a schematic cross-sectional view of a liquid crystal display device having a known FFS-mode electrode structure. FIG. 20 illustrates a structure of a liquid crystal display device. In a lower substrate 810, where an upper layer electrode (iv) serving as an electrode provided with a slit is arranged, an upper layer electrode (iv) and a lower layer electrode (v) serving as a planar electrode, are arranged with an insulating layer 813 interposed between the upper layer electrode (iv) and the lower layer electrode (v). The liquid crystal display device makes a response, in rise time, by supplying a constant voltage to the upper layer electrode (iv) (for example, any voltage can be supplied as long as a potential difference between the upper layer electrode (iv) and the lower layer electrode (v) is equal to or greater than a threshold value such that a response can be made in a fringe electric field), and in fall time, by making the potential difference between the upper layer electrode (iv) and the lower layer electrode (v) lower than the threshold value and stopping (weakening) the fringe electric field.

The known FFS mode performs switching in rise time by generating the fringe electric field using the FFS electrodes of the lower substrate as described above, and by rotating the liquid crystal molecules in or near the FFS electrodes of the lower substrate in the same direction in a horizontal plane. Additionally, such switching in fall time is performed by turning off the fringe electric field to return the liquid crystal molecules to the original alignment state by using the viscoelasticity.

However, in the liquid crystal layer, there is a region where the electric field for rotating the liquid crystal molecules is weak, and hence time is needed for causing the liquid crystal molecules to rotate in such a region. Furthermore, in this situation, since the liquid crystal molecules rotate in the same direction, strain in the horizontal plane caused by elastic deformation of the liquid crystal is small. Accordingly, when the switching is performed in fall time by turning off the electric field, there is small restoring force caused by the elastic strain acting for returning to the original alignment state and the response is slow. Therefore, in both switching in rise time and switching in fall time, the response times are slow.

Here, the inventors of the present invention have made various studies on liquid crystal display devices that perform display by applying an electric field generated by a plurality of electrodes, and have focused on an electrode structure of a lower substrate. Although in the known FFS-mode liquid crystal display device, the lower substrate includes a two-layer electrode to which two different voltages can be supplied, the inventors of the present invention have arrived at a liquid crystal display device in which the lower substrate includes a two-layer electrode to which three different voltages can be supplied, and the lower substrate includes a pair of comb-shaped electrodes. Moreover, the inventors of the present invention have found that, in such a liquid crystal display device, not only a wide viewing angle but a high-speed response can also be achieved (for example, driving for making a response speed higher than the driving of the FFS mode in Comparative Example 2, as will be described later (a first driving scheme)). Here, in the driving of the liquid crystal display device described above that achieves a higher speed response than a response in the FFS mode (the first driving scheme), there is room for improving a contrast ratio by preventing black floating (transmittance is not sufficiently reduced in black display) caused by a voltage constantly supplied to the lower layer electrode of the lower substrate. The voltage value of the lower layer electrode can be reduced to prevent the black floating, but when the voltage value of the lower layer electrode is reduced, the alignment of the liquid crystal molecules may become unstable, and therefore there is room for contriving to achieve a desired alignment.

The present invention has been made in view of the above-described circumstances, and an object thereof is to provide a liquid crystal display device capable of achieving a high-contrast ratio and a wide viewing angle, and achieving a high-speed response.

Solution to Problem

The inventors of the present invention have further made a width of one specific electrode of a pair of comb-shaped electrodes larger than a width of the other electrode. The inventors of the present invention have conceived that this electrode structure addresses the above issue, and have arrived at the present invention.

According to one aspect of the present invention, a liquid crystal display device includes: an upper substrate and a lower substrate; and a liquid crystal layer held between the upper substrate and the lower substrate, and the liquid crystal layer includes liquid crystal molecules horizontally aligned with respect to main surfaces of the upper substrate and the lower substrate when no voltage is supplied, the lower substrate includes a first electrode, a second electrode in a different layer from a layer of the first electrode, and a third electrode in a different layer from the layer of the first electrode, the first electrode includes a plurality of linear portions, the second electrode and the third electrode configure a pair of electrodes each having a comb shape, each of the pair of electrodes each having a comb shape includes a trunk portion and a plurality of branch portions to be branched from the trunk portion, in a plan view, at least one contour line of the plurality of linear portions of the first electrode intersects with one of the branch portions of the second electrode and one of the branch portions of the third electrode, the one of the branch portions of the second electrode and the one of the branch portions of the third electrode being adjacent to each other, a length of a part intersecting with one of the branch portions of the third electrode is longer than a length of a part intersecting with the one of the branch portions of the second electrode, and the liquid crystal display device is configured to perform a driving operation for making a potential difference between the first electrode and the third electrode equal to or greater than a potential difference between the first electrode and the second electrode.

According to another aspect of the present invention, a liquid crystal display device includes: an upper substrate and a lower substrate; and a liquid crystal layer held between the upper substrate and the lower substrate, and the liquid crystal layer includes liquid crystal molecules horizontally aligned with respect to main surfaces of the upper substrate and the lower substrate when no voltage is supplied, the lower substrate includes a first electrode, a second electrode in a different layer from a layer of the first electrode, and a third electrode in a different layer from the layer of the first electrode, the first electrode includes a plurality of linear portions, the second electrode and the third electrode configure a pair of electrodes each having a comb shape, each of the pair of electrodes each having a comb shape includes a trunk portion and a plurality of branch portions to be branched from the trunk portion, in a plan view, at least one contour line of the plurality of linear portions of the first electrode intersects with the one of the branch portions of the second electrode and one of the branch portions of the third electrode, the one of the branch portions of the second electrode and the one of the branch portions of the third electrode being adjacent to each other, an average width of the branch portions of the third electrode is larger than an average width of the branch portions of the second electrode, and the liquid crystal display device is configured to perform a driving operation for making a potential difference between the first electrode and the third electrode equal to or greater than a potential difference between the first electrode and the second electrode.

Additionally, in the above-described the liquid crystal display device in the present invention, instead of performing the driving operation in which the potential difference between the first electrode and the third electrode is equal to or greater than the potential difference between the first electrode and the second electrode, a driving operation may be performed in which a polarity of a voltage to be supplied to the first electrode is the same as a polarity of a voltage to be supplied to the second electrode, and is opposite to a polarity of a voltage to be supplied to the third electrode.

Note that, the liquid crystal display device in the present invention is different from the invention disclosed in PTL 1 in that the lower substrate includes electrodes including at least two layers to which three types of voltages can be supplied.

In the liquid crystal display device in the present invention, typically, the first electrode, the second electrode, and the third electrode are electrically separated from one another, and voltages can be separately controlled. In other words, generally, the first electrode, the second electrode, and the third electrode each can have different potentials at equal to or greater than a threshold voltage. In the liquid crystal display device in the present invention, for example, the second electrode and the third electrode of the lower substrate configure a pair of electrodes each having a comb shape, and a slit electrode or an electrode having a comb shape as the first electrode is arranged on the second electrode and the third electrode with an insulating layer or the like interposed between the second electrode and the third electrode.

The first electrode is preferably arranged closer to the liquid crystal layer side than to the second electrode and the third electrode. Additionally, a slit is preferably provided in the first electrode, or the first electrode may have a comb shape. Note that, the second electrode and the third electrode each have a comb shape.

In the liquid crystal display device according to one aspect of the present invention, the length of the portion intersecting with the branch portion of the third electrode is preferably from 5.5 µm to 13 µm. Additionally, in the liquid crystal display device according to another aspect of the present invention, the average width of the branch portions of the third electrode is preferably from 5.5 μm to 13 μm.

In the liquid crystal display device according to one aspect of the present invention, the length of the part intersecting with the branch portion of the third electrode is preferably longer than the length of the part intersecting with the branch portion of the second electrode, by 2.5 μm or greater. Additionally, in the liquid crystal display device according to another aspect of the present invention, the average width of the branch portions of the third electrode is preferably larger than the average width of the branch portions of the second electrode by 2.5 μm or greater.

In the liquid crystal display device in the present invention, an average space between the branch portion of the second electrode and the branch portion of the third electrode is preferably from 2.5 μm to 4.5 μm.

In the driving operation, preferably, an electric field is generated by the electrodes included in the lower substrate, the electric field rotating one part of the liquid crystal molecules in a horizontal plane with respect to the main surfaces of the upper substrate and the lower substrate, and rotating another part of the liquid crystal molecules in an opposite direction to a direction of such one part of the liquid crystal molecules in the horizontal plane with respect to the main surfaces.

Although the known FFS-mode liquid crystal display device generates a fringe electric field using FFS electrodes in the lower substrate in rise time only for rotating the liquid crystal molecules in the fringe electric field in one direction, it is preferable that, in the liquid crystal display device in the present invention, the electrodes included in the lower substrate be configured with electrodes (the above-described first electrode, second electrode, and third electrode) each including two layers, to which three types of voltages can be supplied. For example, an electric field between the first electrode and the second electrode is generated in rise time, and the liquid crystal molecules in a certain region and the liquid crystal molecules in another region rotate in opposite directions from each other in a horizontal plane. In addition, it is preferable that an electric field between the second electrode and the third electrode be generated in fall time, and the liquid crystal molecules in the certain region and the liquid crystal molecules in another region be rotated in an opposite direction to the direction in the rise time in the horizontal plane.

In the driving operation, preferably, an electric field is generated using the electrodes included in the lower substrate to rotate the liquid crystal molecules, in a pixel, to arrange at least two first regions, in which one part of the liquid crystal molecules are rotated in the horizontal plane with respect to the main surfaces, and at least two second regions, in which another part of the liquid crystal molecules are rotated in an opposite direction to a direction of the part of the liquid crystal molecules in the horizontal plane with respect to the main surfaces, in an alternating manner.

At least two first regions and at least two second regions being arranged in an alternating manner indicates that at least two first regions and at least two second regions may be arranged in an alternating manner in a stripe shape, or may be arranged in an alternating manner in a zigzag lattice shape.

Preferably, slits are arranged in the first electrode, and the above-described liquid crystal display device is configured to perform a driving operation for generating an electric field using the electrodes, such that the electric field for rotating one part of the liquid crystal molecules in the horizontal plane with respect to the main surfaces, and for rotating another part of the liquid crystal molecules in an opposite direction to a direction of such one part of the liquid crystal molecules in the horizontal plane with respect to the main surfaces, is generated in a region superimposed with the slits, when the lower substrate is viewed in a plan view.

Note that, in the present specification, "rotating one part of the liquid crystal molecules in the horizontal plane with respect to the main surfaces and rotating another part of the liquid crystal molecules in an opposite direction to a direction of such one part of the liquid crystal molecules in the horizontal plane with respect to the main surfaces in a region superimposed with the slit" may include any operation in which, when the lower substrate is viewed in a plan view, in at least one region superimposed with one slit and corresponding to the one slit, rotates one part of the liquid crystal molecules in the horizontal plane and rotates another part of the liquid crystal molecules in an opposite direction to a direction of such one part of the liquid crystal molecules in the horizontal plane. However, preferably, when the lower substrate is viewed in a plan view, in each of the regions superimposed with one slit and corresponding to the one slit, one part of the liquid crystal molecules are rotated in the horizontal plane and another part of the liquid crystal molecules are rotated in an opposite direction to a direction of such one part the liquid crystal molecules in the horizontal plane.

In particular, preferably, slits are arranged in the first electrode, and when the lower substrate is viewed in a plan view, the liquid crystal display device is configured to perform a driving operation for generate an electric field using the electrodes, such that one part of the liquid crystal molecules are rotated in the horizontal plane with respect to the main surfaces and another part of the liquid crystal molecules are rotated in an opposite direction to a direction of such one part of the liquid crystal molecules in the horizontal plane with respect to the main surfaces in a region superimposed with the slit provided in the first electrode, and one part of the liquid crystal molecules are rotated in the horizontal plane with respect to the main surfaces and another part of the liquid crystal molecules are rotated in an opposite direction to a direction of such one part of the liquid crystal molecules in the horizontal plane with respect to the main surfaces in a region superimposed with a region between comb teeth of the second electrode and the third electrode.

In the liquid crystal display device in the present invention, an electrode for driving the liquid crystal may be arranged or may not be arranged in the upper substrate. However, for example, preferably, the electrode is not arranged. In other words, the electrodes are arranged for driving the liquid crystal only in the lower substrate, in one preferred embodiment of the liquid crystal display device in the present invention.

Furthermore, the shape of the first electrode is not particularly limited. However, for example, slits are arranged in the first electrode, in one preferred embodiment of the present invention. Additionally, the first electrode has a comb shape, in another preferred embodiment of the present invention. In the present specification, the electrodes having a comb shape is referred to as a comb-shaped electrode, instead of an electrode having a slit.

The liquid crystal display device in the present invention is preferably configured to perform, in a switching manner, a first driving scheme configured to perform a driving operation, and a second driving scheme configured to perform another driving operation to generate using the electrodes an electric field for rotating the liquid crystal molecules in one direction in the horizontal plane with respect to the main surfaces of the upper substrate and the lower substrate. Rotating in one direction may include rotating in one direction substantially. Additionally, causing the electrodes to generate the electric field may indicate that the electric field is generated by at least one electrode selected from the first electrode, the second electrode, and the third electrode. For example, it is preferable to generate the electric field by supplying a voltage to the first electrode to rotate the liquid crystal molecules in white display, and to weaken or make zero the electric field by lowering the voltage supplied to the first electrode to rotate the liquid crystal molecules in an opposite direction in black display.

In the liquid crystal display device in the present invention, the liquid crystal molecules preferably include positive anisotropy of dielectric constant.

In the liquid crystal display device in the present invention, the lower substrate preferably includes a thin film transistor element, and the thin film transistor element preferably includes an oxide semiconductor.

The configuration of the liquid crystal display device in the present invention is not particularly limited by any other constituent elements, and any other configurations normally used for liquid crystal display devices are applicable as appropriate.

Advantageous Effects of Invention

According to the liquid crystal display device in the present invention, a high-contrast ratio and a wide viewing angle are achievable, and a high-speed response is also achievable.

DESCRIPTION OF EMBODIMENT

Figure 1:
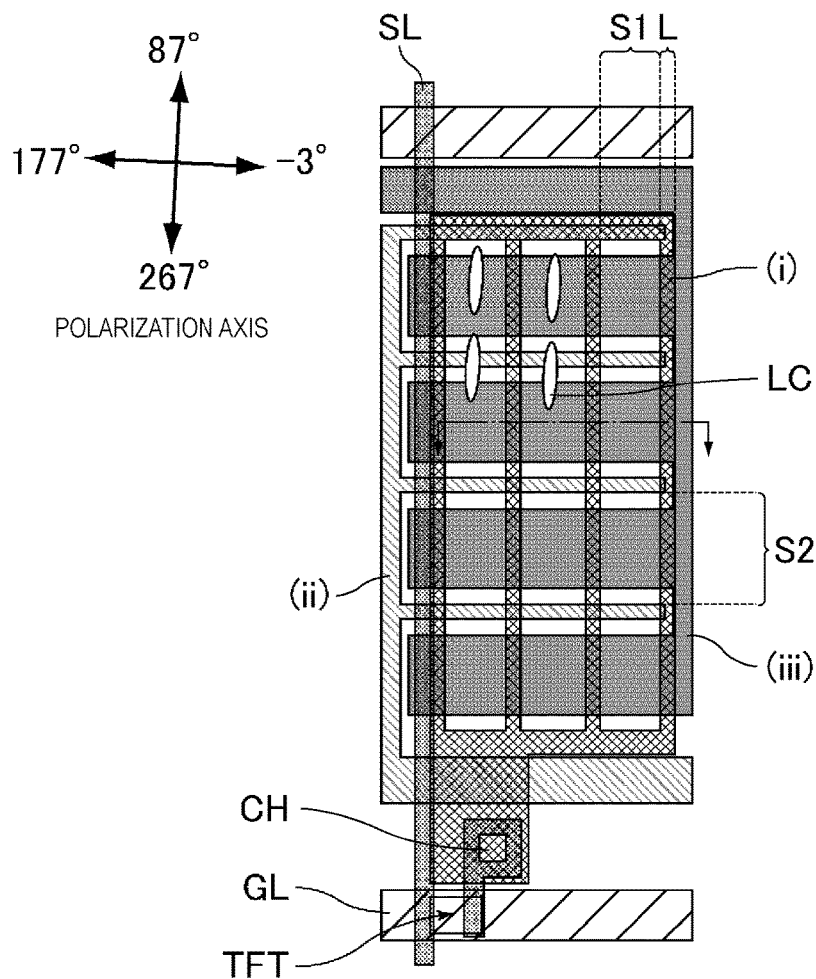
FIG. 1 is a schematic plan view illustrating an electrode structure of a pixel and an initial alignment of liquid crystal molecules of a liquid crystal display device in Example 1.

The present invention will be described in detail below using examples with reference to the drawings; the present invention, however, is not limited only to these examples. In the present specification, a pixel may be a pixel (sub pixel) unless otherwise stated. The pixel (sub pixel) refers to a region indicating any single color such as Red (R), Green (G), Blue (B), Yellow (Y), or the like, for example. Additionally, a pair of substrates interposing a liquid crystal layer are also referred to as upper and lower substrates, and of these substrates, a substrate on a display surface side is also referred to as an upper substrate, and a substrate on a side opposite to the display surface is also referred to as a lower substrate. Furthermore, among electrodes arranged in the substrate, an electrode on the display surface side is also referred to as an upper layer electrode, and an electrode on the side opposite to the display surface side is also referred to as a lower layer electrode.

Note that, in each of the examples, the same reference numerals are assigned to members and portions that provide the same functions. Furthermore, in the drawings, unless otherwise noted, a reference numeral (i) represents a slit electrode in an upper layer (the liquid crystal layer side) of a lower substrate, a reference numeral (ii) represents a comb-shaped electrode in a lower layer (the side opposite to the liquid crystal layer side) of the lower substrate, and a reference numeral (iii) represents another comb-shaped electrode in the lower layer of the lower substrate. Note that, the upper layer electrode (i) may be a comb-shaped electrode. The lower layer electrode (ii) and the lower layer electrode (iii) are opposite to each other when a substrate main surface is viewed in a plan view. A reference numeral (iv) represents an upper layer electrode in an electrode layer having an FFS structure, and a reference numeral (v) represents a lower layer electrode in the electrode layer having the FFS structure. Furthermore, in the drawings, layers that are not related to electric field control of the liquid crystal, such as a color filter, a black matrix, and the like, are omitted.

In the present specification, the electrode in the lower substrate refers to at least one of the upper layer electrode (i), the lower layer electrode (ii), and the lower layer electrode (iii).

In the present specification, a slit electrode refers to an electrode provided with a slit, and typically includes a plurality of linear portions (linear electrode portions). Such a slit, for example, indicates a region in which no linear electrode is formed.

The upper layer electrode (i), the lower layer electrode (ii), and the lower layer electrode (iii) are generally capable of having different potentials at equal to or higher than a threshold voltage. In the present specification, the threshold voltage refers to a voltage value giving a transmittance of 5% when the transmittance in a bright state is set to 100%. "Being capable of having different potentials at equal to or higher than the threshold voltage" may be any state that achieves a driving operation to make different potentials available at equal to or higher than the threshold voltage. This favorably enables control of an electric field applied to the liquid crystal layer. As such a configuration capable of making different potentials available, for example, when the upper layer electrode (i) is a pixel electrode and the lower layer electrode (ii) and the lower layer electrode (iii) are common electrodes, a Thin Film Transistor (TFT) element may be connected to the upper layer electrode (i) to vary the voltage value, and an Alternating Current voltage (AC voltage) may be supplied to perform Alternating Current drive (AC-drive) on the liquid crystal, and in addition, an AC voltage may be supplied to the lower layer electrode (ii) and the lower layer electrode (iii) by using another TFT to perform AC-drive on the liquid crystal, an AC voltage may be supplied to the lower layer electrode (ii) and the lower layer electrode (iii) commonly connected by each line or commonly connected in all pixels by using the TFT corresponding to the line or all the pixels to perform AC-drive on the liquid crystal, or a Direct Current voltage (DC voltage) may be supplied to the lower layer electrode (ii) and the lower layer electrode (iii) without using the TFT to perform Direct Current drive (DC-drive) on the liquid crystal.

In the present specification, "generating an electric field using the electrodes" may indicate an electrical field is generated by at least one electrode selected from the first electrode, the second electrode, and the third electrode. For example, when the liquid crystal display device is turned on, the electric field may always be favorably generated between the second electrode and the third electrode, the voltage of the first electrode may be increased to rotate the liquid crystal molecules in white display, and in black display, the voltage of the first electrode may be reduced to rotate the liquid crystal molecules in an opposite direction.

Note that, it is assumed that an angle formed between an extension direction of the linear portions of the upper layer electrode (i) and an alignment direction of the liquid crystal molecules forms a positive angle, when the alignment direction of the liquid crystal molecules forms a clockwise angle relative to the extension direction of the linear portions of the upper layer electrode (i), and forms a negative angle, when the alignment direction forms a counterclockwise angle relative to the extension direction of the linear portions of the upper layer electrode (i).

For example, in the liquid crystal display device in the present invention to be driven in a transverse electric field, electrodes of two layers including a comb-shaped electrode serving as the lower layer and a slit electrode (or a comb-shaped electrode) serving as the upper layer may be arranged with an insulating layer interposed between the electrodes of two layers. The liquid crystal display device may be preferably driven by supplying a voltage to the slit electrode (or the comb-shaped electrode) of the upper layer side, with the transverse electric field being constantly supplied between the comb-shaped electrodes on the lower layer side (on the opposite side to the liquid crystal layer side) of the electrodes of two layers.

In the present specification, "rise time" refers to a period when a display state changes from a dark state (black display) to a bright state (white display). Furthermore, "fall time" refers to a period when the display state changes from the bright state (white display) to the dark state (black display). Additionally, "an initial alignment of the liquid crystal" refers to alignment of the liquid crystal molecules when no voltage is supplied.

In the present specification, "one part of the liquid crystal molecules" refers to one or more of the liquid crystal molecules included in the liquid crystal layer. In addition, "another part of the liquid crystal molecules" similarly refers to another part or other parts of the liquid crystal molecules included in the liquid crystal layer, excluding the above-described one part of the liquid crystal molecules.

Example 1

FIG. 1 is a schematic plan view illustrating an electrode structure of a pixel and an initial alignment of liquid crystal molecules of a liquid crystal display device in Example 1.

An upper layer electrode (i) includes a plurality of linear portions, when a lower substrate is viewed in a plan view. The plurality of linear portions are substantially parallel with one another, and slits substantially parallel with one another are provided between the respective linear portions. As described above, the slits are arranged in the upper layer electrode (i), in one preferred embodiment of the present invention. Note that, the upper layer electrode (i) may be a comb-shaped electrode instead of a slit electrode. The upper layer electrode (i) has a comb shape, in another preferred embodiment of the present invention.

A lower layer electrode (ii) and a lower layer electrode (iii) are each configured with a trunk portion and branch portions extending from the trunk portion, when the lower substrate is viewed in a plan view. The branch portions include a plurality of linear electrode portions which are substantially parallel with one another. In this manner, the lower layer electrode (ii) and the lower layer electrode (iii) each have a comb shape.

As described above, the upper layer electrode (i), the lower layer electrode (ii), and the lower electric electrode (iii) each preferably have linear portions.

Note that, the structures of the upper layer electrode (i), the lower layer electrode (ii), and the lower electric electrode (iii) illustrated in FIG. 1 are merely examples, the shape is not limited thereto, and electrodes having various structures can be used.

In the upper layer electrode (i), an electrode width L of the linear portions is 3 μm, and an electrode space S1 between adjacent linear portions is 6 μm. The electrode width L is preferably from 2 μm to 7 μm, for example. Additionally, the electrode space S1 is preferably from 2 μm to 14 μm, for example. A ratio of the electrode width L to the electrode space S1 (L/S1) is preferably from 0.1 to 1.5. The lower limit value of the ratio L/S1 is more preferably 0.2, and the upper limit value is more preferably 1.2.

The width of the branch portion of each of the lower layer electrode (ii) and the lower layer electrode (iii) serves as a key point in the present invention. This will be described in detail with reference to FIG. 3, as will be described later.

An extension direction of the respective branch portions of the lower layer electrode (ii) and the lower layer electrode (iii) is set to a direction forming 90 degrees with respect to an extension direction of the linear portions of the upper layer electrode (i). In other words, the two comb-shaped electrodes included in the lower substrate are arranged such that the extension direction of the linear portions serving as the branch portions intersects with the extension direction of the linear portions of the upper layer electrode (i) by an angle of 90 degrees when the lower substrate is viewed in a plan view. The angle is preferably from 30 degrees to 90 degrees, more preferably 45 degrees or greater, even more preferably 60 degrees or greater, and further preferably 75 degrees or greater. Such an electrode structure further shortens response times in rise time and in fall time.

Furthermore, the branch portion included in the lower layer electrode (ii) of the lower substrate in FIG. 1 is arranged between the branch portions included in the lower layer electrode (iii). Note that, S2 refers to an electrode space between adjacent branch portions in the lower layer electrode (ii).

The electrodes in the respective layers (the upper layer electrode (i), the lower layer electrode (ii), and the lower layer electrode (iii)) are arranged with a positional relationship as illustrated in FIG. 1. As described above, the slits are arranged in the upper layer electrode (i) of the lower substrate and the lower layer electrode (ii) and the lower layer electrode (iii) of the lower substrate each have a comb shape, but the upper layer electrode (i), the lower layer electrode (ii), and the lower layer electrode (iii) each may have a comb shape.

Example 1 uses two linear polarizing plates having polarization axes illustrated in FIG. 1. In Example 1, one linear polarizing plate is arranged on respective outer sides of the upper and lower substrates (on the opposite side to the liquid crystal layer side). As an arrangement of the linear polarizing plates, a cross Nicol arrangement is used in which the polarization axes of the linear polarizing plates in the upper and lower substrates are vertical to or parallel with long axes of liquid crystal molecules LC (an initial alignment orientation of the liquid crystal molecules) when no voltage is supplied, so that a liquid crystal display device in a normally black mode is configured. As described above, the upper and lower substrates each preferably have a linear polarizing plate.

The upper layer electrode (i) is electrically connected through a contact hole CH to a drain electrode extending from a thin film transistor element TFT. At a timing selected by a gate bus line GL, a voltage supplied from a source driver through a source bus line SL is supplied to the upper layer electrode (i), which drives the liquid crystal through the thin film transistor element TFT.

Figure 2:
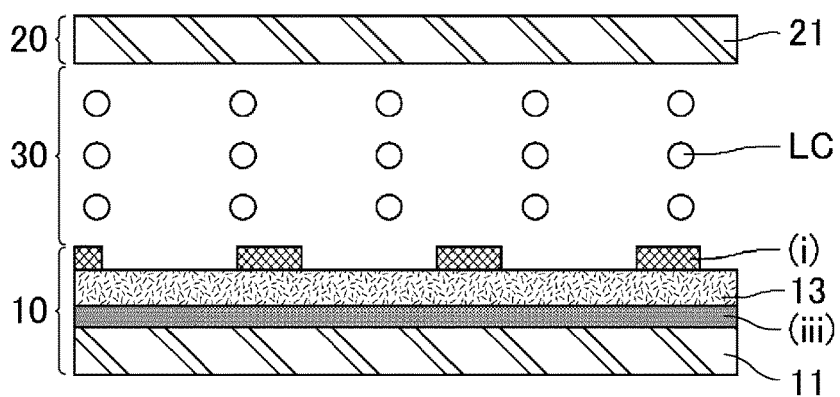
FIG. 2 is a schematic cross-sectional view illustrating a cross section of a portion corresponding to a line segment illustrated by a dot-dash line in FIG. 1.

FIG. 2 is a schematic cross-sectional view illustrating a cross section of a portion corresponding to a line segment illustrated by a dot-dash line in FIG. 1.

As illustrated in FIG. 2, the liquid crystal display device in Example 1 has a configuration in which a lower substrate 10 including a glass substrate 11, a liquid crystal layer 30, and an upper substrate 20 including a glass substrate 21 are layered in this order from a rear surface side to an observed surface side of the liquid crystal display device.

The liquid crystal display device in Example 1, as illustrated in FIG. 2, horizontally aligns the liquid crystal molecules LC (in FIG. 2, the liquid crystal molecules LC are aligned from back to front in cross section), when a potential difference between the electrodes included in the upper and lower substrates is lower than a threshold voltage.

Each of the lower layer electrode (ii) (not illustrated in FIG. 2) and the lower layer electrode (iii) of the lower substrate 10 is a comb-shaped electrode as described above, and the upper layer electrode (i), serving as a slit electrode, is arranged above the lower layer electrode (ii) and the lower layer electrode (iii), on an insulating layer 13. No electrode for driving the liquid crystal is provided in the upper substrate 20, and an electrode for driving the liquid crystal is provided in the lower substrate 10 only.

The insulating layer 13 has a dielectric constant of 6.9, and an average thickness of 0.3 μm. The insulating layer 13 is configured with a nitride film SiN, but instead, an oxide film $SiO_2$, an acrylic resin, or the like, or a combination of these materials can also be used.

In each of the upper and lower substrates, a horizontal alignment film (not illustrated) is provided on the liquid crystal layer side, and the liquid crystal molecules are horizontally aligned such that long axes form an angle of 3 degrees with respect to an extension direction of the linear portions of the upper layer electrode (i) when no voltage is supplied. Note that, the liquid crystal layer and the upper layer electrode (i) are adjacent to each other with the horizontal alignment film interposed between the liquid crystal layer and the upper layer electrode (i). The horizontal alignment film is not limited in particular, as long as the horizontal alignment film horizontally aligns the liquid crystal molecules with respect to the film surface. For example, an alignment film including an organic material (for example, an alignment film having a dielectric constant $\varepsilon=3$ to 4); an alignment film including an inorganic material (for example, an alignment film having a dielectric constant $\varepsilon=5$ to 7); an optical alignment film including a photoactive material; an alignment film subjected to an alignment treatment by a rubbing treatment; or the like are applicable. Note that, by using an alignment film that does not need an alignment treatment, such as the optical alignment film or the like, the process is simplified to reduce costs and to improve the reliability and the yield. Additionally, in a case where a rubbing treatment is performed, liquid crystal contamination caused by intrusion of impurities from a rubbing cloth or the like, dot defects caused by foreign substances, display unevenness due to lack of rubbing uniformity in the liquid crystal panel, or the like, may be generated, but even such disadvantages are eliminated.

The liquid crystal includes the liquid crystal molecules to be aligned in a horizontal direction with respect to the substrate main surface, when no voltage is supplied. Note that, "aligned in the horizontal direction with respect to the substrate main surface" can indicate that the liquid crystal molecules are aligned in a substantially horizontal direction with respect to the substrate main surface in the technical field of the present invention, and may exhibit optical operational advantages. The above liquid crystal is substantially configured with the liquid crystal molecules to be aligned in the horizontal direction with respect to the substrate main surface, when no voltage is supplied. The above-described "when no voltage is supplied" may indicate that no voltage is substantially supplied in the technical field of the present invention. Such a liquid crystal of horizontal alignment type is advantageous for enabling wide viewing angle characteristics or the like.

Anisotropy of dielectric constant of the liquid crystal material in the liquid crystal layer 30 of the liquid crystal display device in Example 1 is positive (anisotropy of dielectric constant $\Delta\varepsilon=5.9$, viscosity (rotation viscosity) $\gamma1=89$ cps, refractive index anisotropy $\Delta n=0.109$, and panel $Re=350$ nm). As described above, the liquid crystal layer includes the liquid crystal molecules having the positive anisotropy of dielectric constant, in one preferred embodiment of the present invention. The liquid crystal molecules having the positive anisotropy of dielectric constant are aligned in a constant direction when an electric field is applied, the alignment control can easily be performed, and a higher speed response can be achieved. The anisotropy of dielectric constant $\Delta\varepsilon$ of the liquid crystal is preferably 3 or greater, more preferably 4 or greater, and even more preferably 5 or greater. Additionally, the anisotropy of dielectric constant $\Delta\varepsilon$ of the liquid crystal is preferably 30 or less, more preferably 20 or less, and even more preferably 10 or less. In the present specification, the anisotropy of dielectric constant $\Delta\varepsilon$ of the liquid crystal refers to a value measured by an LCR meter.

In Example 1, the liquid crystal layer 30 has an average thickness (a cell gap) $d_{LC}$ of 3.2 µm.

In the present specification, the average thickness $d_{LC}$ of the liquid crystal layer denotes a value obtained by calculating an average thickness of the entire liquid crystal layer in the liquid crystal display device.

The value of $d_{LC} \times \Delta n$ is preferably 100 nm or greater, more preferably 150 nm or greater, and even more preferably 200 nm or greater. Additionally, the value of $d_{LC} \times \Delta n$ is preferably 550 nm or smaller, more preferably 500 nm or smaller, and even more preferably 450 nm or smaller.

Hereinafter, a driving method of the liquid crystal by using the liquid crystal display device in the present example will be described.

In the present example, high-responsive driving is enabled. Additionally, switching voltage supplying methods enables two types of driving schemes with the same configuration, including driving capable of performing a high-speed response and driving achieving a higher transmittance than the above driving.

In the present specification, the driving capable of achieving the high-speed response is referred to as a first driving scheme, and the driving that achieves a higher transmittance than the first driving scheme is referred to as a second driving scheme.

Both the first driving scheme and the second driving scheme vary the voltage of the upper layer electrode (i) to perform the gray scale display.

In the first driving scheme, voltages are supplied with the polarities inversed and the amplitude center set to 0 V, such that the lower layer electrode (ii) and the lower layer electrode (iii) have opposite polarities to each other, to constantly generate a transverse electric field, and voltages are supplied by inverting the polarity in accordance with a gray scale to the upper layer electrode (i). Here, the liquid crystal display device in Example 1 is configured to perform a driving operation such that the polarity of the voltage supplied to the upper layer electrode (i) is the same as the polarity of the voltage supplied to the lower layer electrode (ii), and is different from the polarity of the voltage supplied to the lower layer electrode (iii). Furthermore, the liquid crystal display device in Example 1 is configured to perform a driving operation such that a potential difference between the upper layer electrode (i) and the lower layer electrode (iii) is equal to or greater than a potential difference between the upper layer electrode (i) and the lower layer electrode (ii). The driving operation in a latter case can be performed even in a case where the polarity of the voltage supplied to the upper layer electrode (i), the polarity of the voltage supplied to the lower layer electrode (ii), and the polarity of the voltage supplied to the lower layer electrode (iii) are the same. For example, voltages may be symmetrically supplied to the lower layer electrode (ii) and the lower layer electrode (iii) at amplitude 0 V to 12 V with to the amplitude center set to 6V.

In the second driving scheme, the liquid crystal is driven such that both the voltages of the lower layer electrode (ii) and the lower layer electrode (iii) are set to 0 V, and a voltage is supplied to the upper layer electrode (i) in accordance with the gray scale by inverting the polarity, to generate a fringe electric field between the upper layer electrode (i), and the lower layer electrode (ii) and the lower layer electrode (iii).

Figure 3:
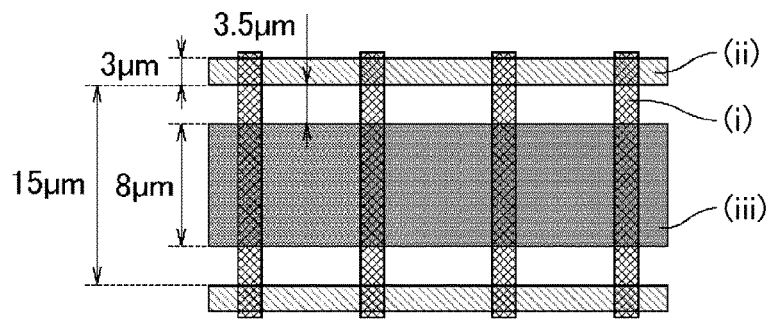
FIG. 3 is a schematic view illustrating an upper layer electrode (i), a lower layer electrode (ii), and a lower layer electrode (iii) in Example 1.

FIG. 3 is a schematic view illustrating the upper layer electrode (i), the lower layer electrode (ii), and the lower layer electrode (iii) in Example 1.

In FIG. 3, an electrode width of a branch portion in the lower layer electrode (ii) (a length of a part, in a contour line of the upper layer electrode (i), intersecting with a branch portion of the lower layer electrode (ii)) is 3 µm, an electrode width of a branch portion of the lower layer electrode (iii) (a length of a part, in the contour line of the upper layer electrode (i), intersecting with a branch portion of the lower layer electrode (iii)) is 8 μm, and an electrode space between the branch portion of the lower layer electrode (ii) and the branch portion of the lower layer electrode (iii) is 3.5 μm.

In the present invention, at least one contour line among the plurality of linear portions of the upper layer electrode (i) is configured to intersect with the branch portion of the lower layer electrode (ii) and the branch portion of the lower layer electrode (iii) adjacent to each other. The length of the part, in the contour line, intersecting with the branch portion of the lower layer electrode (iii) may be longer than the length of the part, in the contour line, intersecting with the branch portion of the lower layer electrode (ii), or the average width of the branch portions of the lower layer electrode (iii) may be larger than the average width of the branch portions of the lower layer electrode (ii). This achieves an improved contrast ratio of the liquid crystal display device in the present invention, as will be described later. Note that, a vertical positional relationship of the upper layer electrode (i) and the lower layer electrode (ii) and the lower layer electrode (iii) may be reversed.

In the branch portion of the lower layer electrode (ii), a length of a part intersecting with the contour line or the average electrode width is preferably from 2.5 μm to 4.5 μm.

Additionally, in the branch portion of the lower layer electrode (iii), a length of a part intersecting with the contour line, or the average electrode width is preferably 5.5 μm or greater and preferably 13 μm or less.

Additionally, the average electrode space between the branch portion of the lower layer electrode (ii) and the branch portion of the lower layer electrode (iii) is preferably 2.5 μm or greater, and preferably 4.5 μm or less.

Note that, the average electrode width of the lower layer electrode (ii), the average electrode width of the lower layer electrode (iii), and the average electrode space between the branch portion of the lower layer electrode (ii) and the branch portion of the lower layer electrode (iii) adjacent to each other are each an average value in a pixel. Note that, each of the average electrode width and the average electrode space is preferably substantially the same in the pixel.

Figure 4:
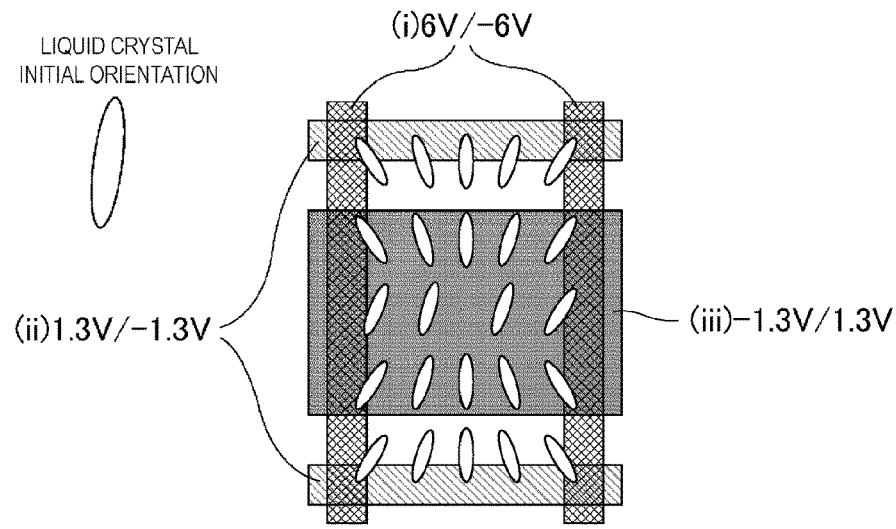
FIG. 4 is a schematic plan view illustrating a voltage supplied to each of the electrodes and the alignment of the liquid crystal molecules in white display of a first driving scheme in Example 1.
Figure 5:
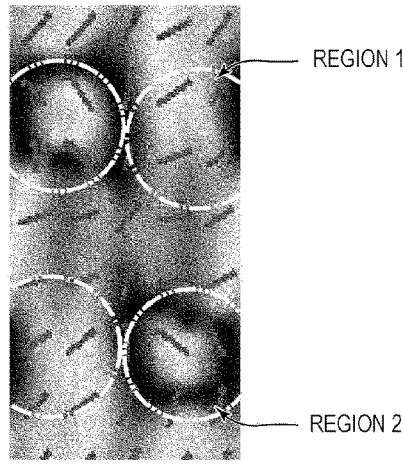
FIG. 5 is a simulation result illustrating a director distribution and a transmittance distribution corresponding to FIG. 4.
Figure 6:
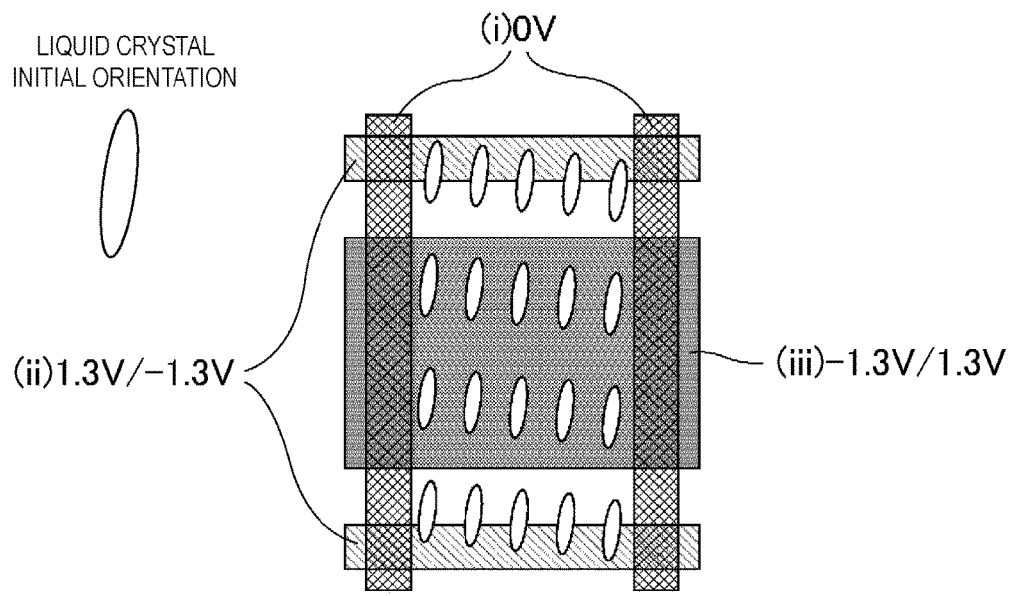
FIG. 6 is a schematic plan view illustrating the voltage supplied to each of the electrodes and the alignment of the liquid crystal molecules in black display of the first driving scheme in Example 1.
Figure 7:
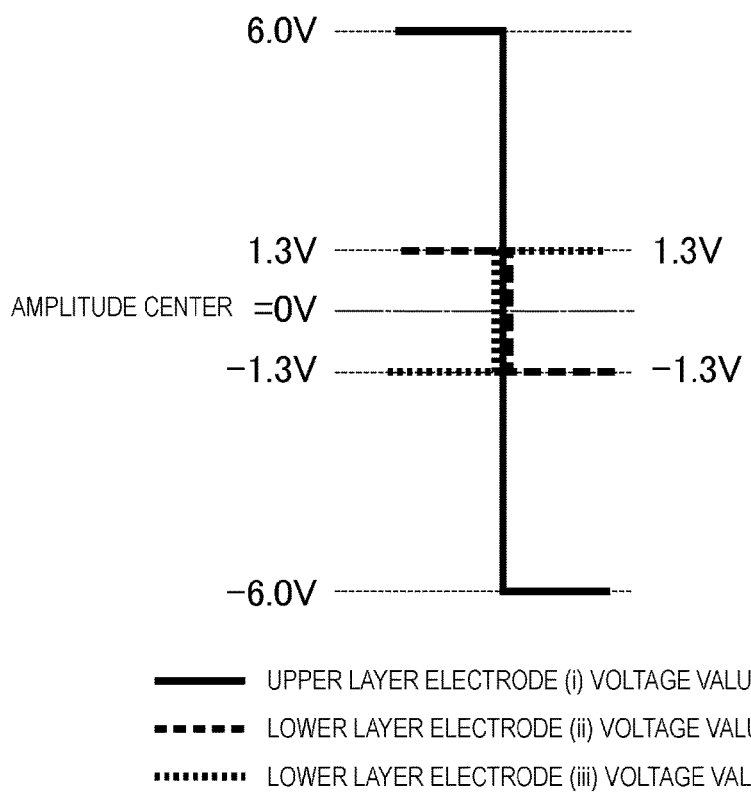
FIG. 7 is a voltage relation diagram illustrating the voltage supplied to each of the electrodes in white display of the first driving scheme in Example 1.

FIG. 4 is a schematic plan view illustrating the voltage supplied to each of the electrodes and the alignment of the liquid crystal molecules in white display of the first driving scheme in Example 1. FIG. 5 is a simulation result illustrating a director distribution and a transmittance distribution corresponding to FIG. 4. FIG. 6 is a schematic plan view illustrating the voltage supplied to each of the electrodes and the alignment of the liquid crystal molecules in black display of the first driving scheme in Example 1. FIG. 7 is a voltage relation diagram illustrating the voltage supplied to each of the electrodes in white display of the first driving scheme in Example 1. FIG. 4 to FIG. 7 each illustrate a portion surrounded by the linear portions of the upper layer electrode (i) and the branch portions of the lower layer electrode (ii) in FIG. 1.

First, operations of the liquid crystal molecules in rise time will be described in detail.

As illustrated in FIG. 4 and FIG. 7, voltages are constantly supplied to the lower layer electrode (ii) and the lower layer electrode (iii), by inverting the polarities of the voltages with the amplitude center set to 0 V, such that the polarities are opposite to each other and a transverse electric field is constantly generated. Note that, absolute values of the voltages supplied to the lower layer electrode (ii) and the lower layer electrode (iii) are kept constant. Furthermore, a voltage is supplied to the upper layer electrode (i) while inverting the polarity to have the same polarity with the polarity of the voltage supplied to the lower layer electrode (ii), to generate an electric field that rotates the liquid crystal molecules in different orientations in a horizontal plane in an alternating manner, and the liquid crystal molecules are aligned by such an electric field to form a bend alignment and a spray alignment in the horizontal plane. In the first driving scheme of the present example, a voltage of 6 V/−6 V is supplied to the upper layer electrode (i), a voltage of 1.3 V/−1.3 V is supplied to the lower layer electrode (ii), and a voltage of −1.3 V/1.3 V is supplied to the lower layer electrode (iii) in white gray-scale display. The liquid crystal display device in Example 1 is capable of maintaining alignment stability of the liquid crystal molecules, even in a case where the voltages supplied to the lower layer electrode (ii) and the lower layer electrode (iii) are reduced because of a reason to be described later, and therefore voltages supplied to the lower layer electrode (ii) and the lower layer electrode (iii) can be reduced to reduce black floating.

As can be seen from a transmittance distribution diagram (FIG. 5) obtained by a simulation, the liquid crystal molecules rotate in different orientations between regions 1 surrounded by dot-dash lines and regions 2 surrounded by double-dot-dash lines, and it can be seen that the regions 1 and the regions 2 are present in an alternating manner. In other words, in the first driving scheme, the liquid crystal molecules rotate in the different orientations in the horizontal plane in an alternating manner. In the region 1 (the first region) illustrated in FIG. 5, the liquid crystal molecules rotate in the clockwise direction in the horizontal plane, and in the region 2 (the second region), the liquid crystal molecules rotate in the counterclockwise direction in the horizontal plane. In other words, when the lower substrate is viewed in a plan view, between the linear electrodes of the upper layer electrode (i) (in a region superimposed with the slit of the upper layer electrode (i)), between the linear electrodes serving as the branch portions of the lower layer electrode (ii), and between the linear electrodes serving as the branch portions of the lower layer electrode (iii), the liquid crystal molecules do not rotate in one direction in a horizontal plane, but rotate in two different directions in the horizontal plane.

Additionally, by constantly supplying the voltages to the lower layer electrode (ii) and the lower layer electrode (iii) to generate the transverse electric field between the lower layer electrode (ii) and the lower layer electrode (iii), a strong electric field is applied to the entire region in the horizontal plane at a rise response. Accordingly, a rise response at higher speed is achieved.

Next, operations of the liquid crystal molecules in fall time will be described.

In the first driving scheme, since the voltages are always supplied to the lower layer electrode (ii) and the lower layer electrode (iii) in a fall response as well, when the voltage supplied to the upper layer electrode (i) is weakened or reduced to zero, the transverse electric field generated between the lower layer electrode (ii) and the lower layer electrode (iii) forcibly rotates the liquid crystal molecules in a direction to return to an initial alignment. Furthermore, in a case of the first driving scheme, large restoring force acts by elastic strain induced by the bend alignment and the spray alignment generated in the horizontal plane. Accordingly, a fall response is also higher. As illustrated in FIG. 6, in the first driving scheme in the present example, in black gray-scale display, the voltage of the upper layer electrode (i) is set to 0 V, a voltage of 1.3 V/−1.3 V is supplied to the lower layer electrode (ii), and a voltage of −1.3 V/1.3 V is supplied to the lower layer electrode (iii). Note that, in the above first driving scheme, least two regions in which the liquid crystal molecules rotate in different orientations in a plane are consecutively present in an alternating manner. In this manner, preferably, two or more regions in which the liquid crystal molecules rotate in different orientations are present consecutively in the plane.

As described above, in FIG. 6, the potential of the upper layer electrode (i) is set to 0 V. In this manner, excluding a case where the voltage of the pixel electrode (the upper layer electrode (i) in Example 1) is weakened or set to zero from the voltage at the maximum transmittance, potentials or the like of other electrodes (the lower layer electrode (ii) and the lower layer electrode (iii) in Example 1) can be made the same with the potentials or the like in the first driving scheme in white display, and a preferable range or the like is also the same with the range in the first driving scheme in white display. In Example 1, for example, in both white display and black display, the voltage of the lower layer electrode (ii) is 1.3 V/−1.3 V, the voltage of the lower layer electrode (iii) is −1.3 V/1.3 V, in the lower substrate. As described above, the liquid crystal display device of the present invention preferably has the lower layer electrode (ii) and the lower layer electrode (iii) of the lower substrate with an absolute value of a constant voltage in both white display and black display.

In a voltage supplying method for supplying each of the electrodes in the above-described first driving scheme, the upper layer electrode (i) serves as a pixel electrode, and the voltage supplied to the upper layer electrode (i) varies and constant voltages are supplied to the lower layer electrode (ii) and the lower layer electrode (iii), and such a voltage supplying method is one preferred embodiment of the liquid crystal display device of the present invention. However, as long as operational advantages in the present invention are exhibited, the vertical arrangement relationship of the respective electrodes may be changed as appropriate.

Figure 8:
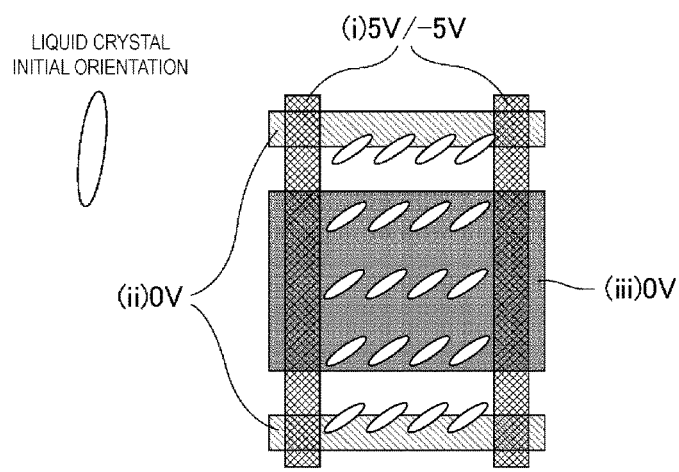
FIG. 8 is a schematic plan view illustrating the voltage supplied to each of the electrodes and the alignment of the liquid crystal molecules in white display of a second driving scheme in Example 1.
Figure 9:
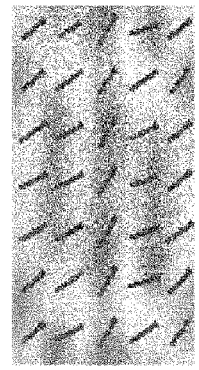
FIG. 9 is a simulation result illustrating a director distribution and a transmittance distribution corresponding to FIG. 8.
Figure 10:
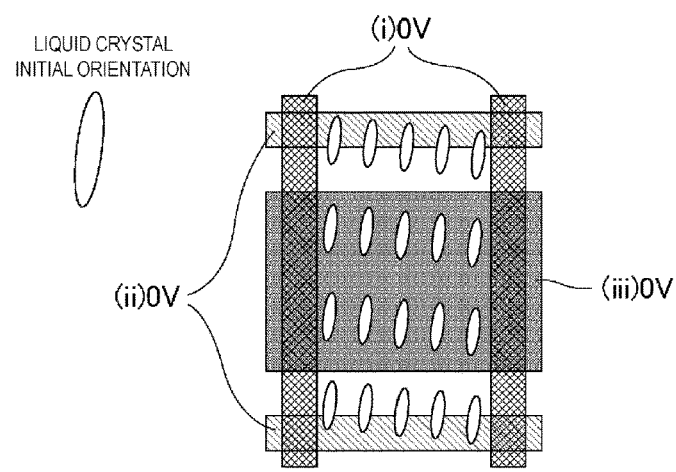
FIG. 10 is a schematic plan view illustrating the voltage supplied to each of the electrodes and the alignment of the liquid crystal molecules in black display of the second driving scheme in Example 1.

FIG. 8 is a schematic plan view illustrating the voltage supplied to each of the electrodes and the alignment of the liquid crystal molecules in white display of the second driving scheme in Example 1. FIG. 9 is a simulation result illustrating a director distribution and a transmittance distribution corresponding to FIG. 8. FIG. 10 is a schematic plan view illustrating the voltage supplied to each of the electrodes and the alignment of the liquid crystal molecules in black display of the second driving scheme in Example 1.

FIG. 8 to FIG. 10 each illustrate a portion surrounded by the linear portions of the upper layer electrode (i) and the branch portions of the lower layer electrode (ii) in FIG. 1.

First, operations of the liquid crystal molecules in rise time will be described in detail.

As illustrated in FIG. 8, by setting the voltages supplied to both the lower layer electrode (ii) and the lower layer electrode (iii) to 0 V and supplying a voltage to the upper layer electrode (i) while inverting the polarity of the upper layer electrode (i), a fringe electric field is generated between the upper layer electrode (i), and the lower layer electrode (ii) and the lower layer electrode (iii). The liquid crystal molecules respond to the electric field and rotate in the same orientation. In the second driving scheme of the present example, a voltage of 5 V/−5 V is supplied to the upper layer electrode (i) in white gray-scale display.

As can be seen from a transmittance distribution diagram (FIG. 9) obtained by a simulation, the liquid crystal molecules rotating in the same orientation makes available the transmittance higher than the transmittance in the first driving scheme as a whole.

Although the voltage of the upper layer electrode (i) varies in accordance with the display, the upper limit is preferably 10 V, more preferably 8 V, and even more preferably 7 V, in white display of the second driving scheme.

Next, operations of the liquid crystal molecules in fall time will be described.

As illustrated in FIG. 10, by turning the voltage supplied to the upper layer electrode (i) off, the liquid crystal molecules rotate to return toward an alignment treatment orientation (anchoring) by restoring force thereof. In the second driving scheme of the present example, the voltage supplied to the upper layer electrode (i) is 0 V in black display. The voltages supplied to other respective electrodes (the lower layer electrode (ii) and the lower layer electrode (iii)) is 0 V, which is the same as that of the second driving scheme in white display. Note that, in black display in the second driving scheme, the voltages supplied to the upper layer electrode (i), the lower layer electrode (ii), and the lower layer electrode (iii) may be lower than a threshold voltage.

Figure 11:
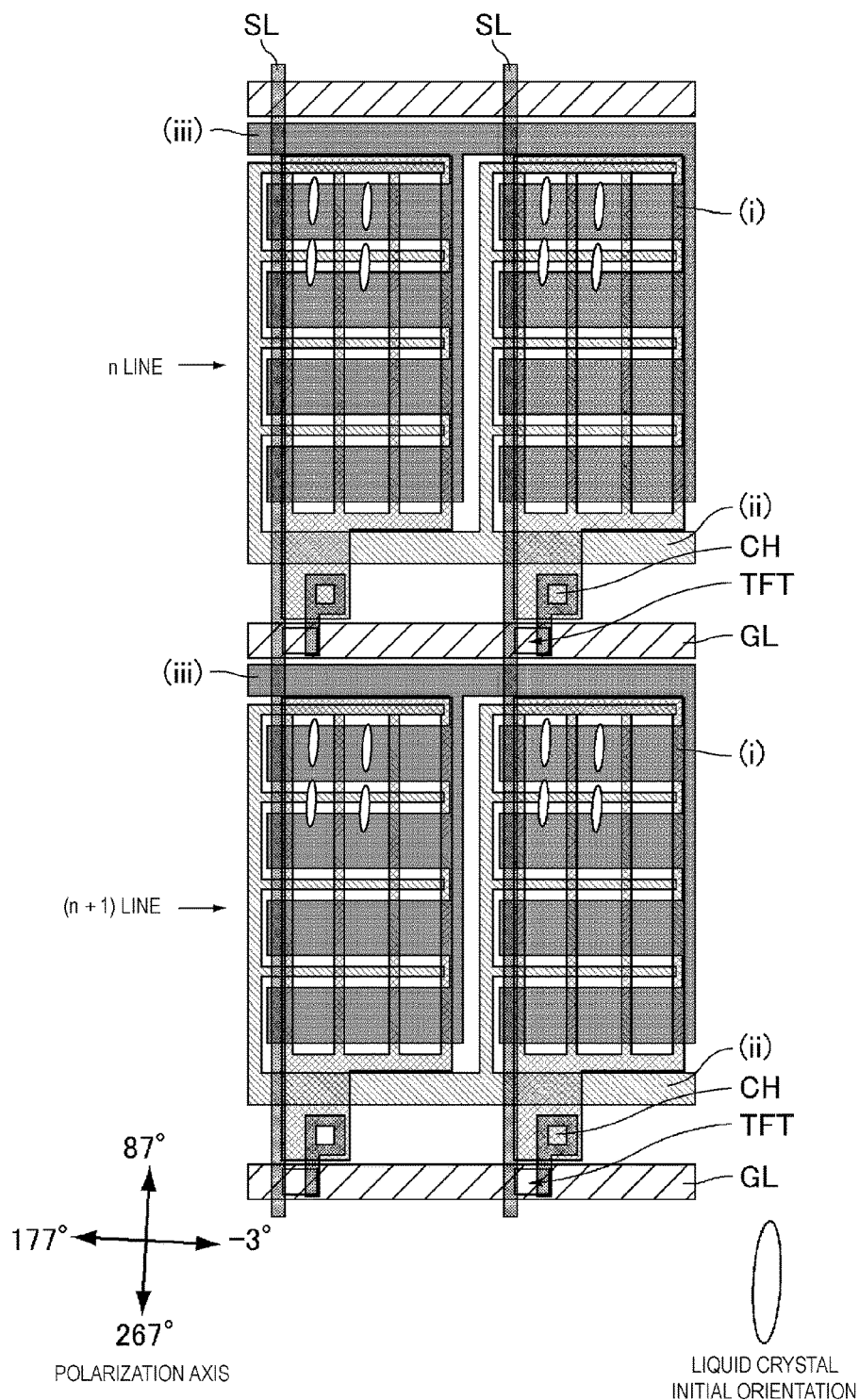
FIG. 11 is a schematic plan view illustrating an example of a pixel layout when the liquid crystal display device in Example 1 is TFT-driven.

FIG. 11 is a schematic plan view illustrating an example of a pixel layout when the liquid crystal display device is TFT-driven in Example 1. Note that, FIG. 11 is simply an example, and the electrode structure, wiring, and the like are not limited thereto.

In Example 1, since the voltages supplied to the lower layer electrode (ii) and the lower layer electrode (iii) are different between the first driving scheme and the second driving scheme, scan driving is performed for, for example, each line (a gate bus line or the like).

Note that, as a thin film transistor element of the liquid crystal display device in Example 1, from the viewpoint for improving the transmittance, a thin film transistor element including an oxide semiconductor is preferably used. The oxide semiconductor has higher carrier mobility than amorphous silicon. This reduces an area occupied by the transistor in one pixel, and thus an aperture ratio can be increased and light transmittance per one pixel can be increased. Accordingly, by using the thin film transistor element including the oxide semiconductor, an improved contrast ratio, as one advantage in the present invention, is remarkably made available. In other words, in the liquid crystal display device in the present invention, the lower substrate preferably includes the thin film transistor element, and the thin film transistor element preferably includes the oxide semiconductor.

The liquid crystal display device in Example 1 is applicable to any liquid crystal display devices of a transmissive type, a reflective type, and a transflective type. This also applies to Examples to be described later.

Figure 12:
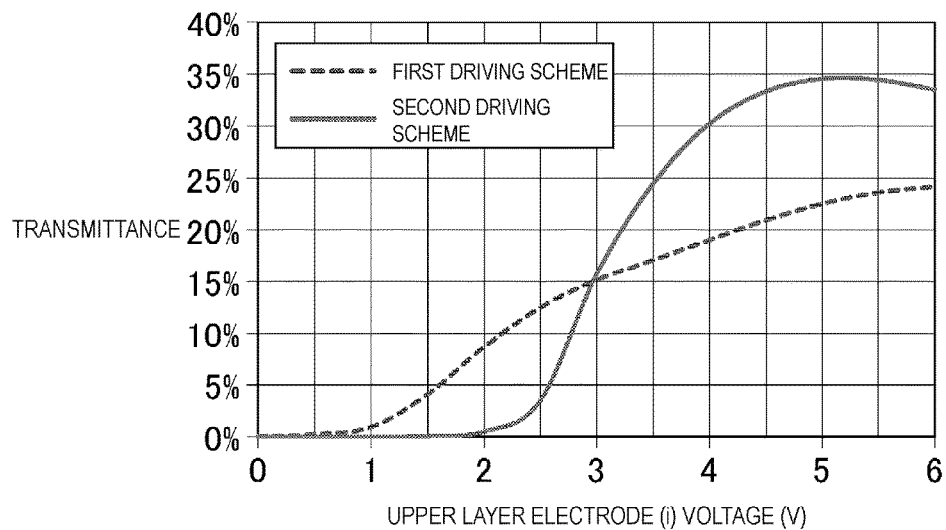
FIG. 12 is a graph illustrating voltage-transmittance (V-T) characteristics of the upper layer electrode (i) in each of the first driving scheme and the second driving scheme in Example 1.

FIG. 12 is a graph illustrating Voltage-Transmittance (V-T) characteristics of the upper layer electrode (i) in each of the first driving scheme and the second driving scheme in Example 1.

By calculating the Voltage-Transmittance (V-T) characteristics in the first driving scheme and the second driving scheme in Example 1 using LCD Master3D, the presence or absence of advantageous effects on a high transmittance was verified by switching from the first driving scheme to the second driving scheme. It has been found that the second driving scheme (the maximum transmittance: 34.5%) had a maximum transmittance higher than the transmittance in the first driving scheme (the maximum transmittance: 24.2%), and the transmittance was improved by the switching from the first driving scheme to the second driving scheme.

TABLE 1

| | Transmittance (%) | |
|---|---|---|
| | First Driving Scheme | Second Driving Scheme |
| Example 1 | 24.2 | 34.5 |

In Example 1, the lower substrate includes two-layer electrodes. As described above, in one preferred embodiment of the liquid crystal display device of the present invention, the electrodes included in the lower substrate are configured with an electrode provided with a slit in the upper layer, and a pair of comb-shaped electrodes in the lower layer. However, since any liquid crystal display device that generates the electric field in the first driving scheme is capable of achieving the advantages in the present invention, for example, a pair of comb-shaped electrodes may be used, instead of the slit electrode, in the upper layer electrode (i) of the lower substrate. In a case where a pair of comb-shaped electrodes are used, the liquid crystal molecules are caused to rotate in the horizontal plane by generating the transverse electric field between the pair of comb-shaped electrodes. A relationship between the alignment direction of the liquid crystal molecules and the electrode arrangement may be understood by replacing the extension direction of the linear portions of the slit electrode included in the FFS electrodes with the extension direction of the branch portions of the pair of comb-shaped electrodes.

The upper and lower substrates included in the liquid crystal display device in Example 1 serve as a pair of substrates for holding the liquid crystal, and are formed by, for example, including an insulating substrate such as a glass, a resin, or the like, as its base, and forming wiring, electrodes, color filters, and the like, on the insulating substrate as appropriate.

Note that, the liquid crystal display device in Example 1 can appropriately include members (for example, a light source and the like), which are included in a typical liquid crystal display device. Additionally, the liquid crystal display device in Example 1 preferably drives the liquid crystal in an active matrix driving scheme. This also applies to Examples to be described later.

Comparison of Response Characteristics Between Example 1 and Comparative Example 1

Figure 13:
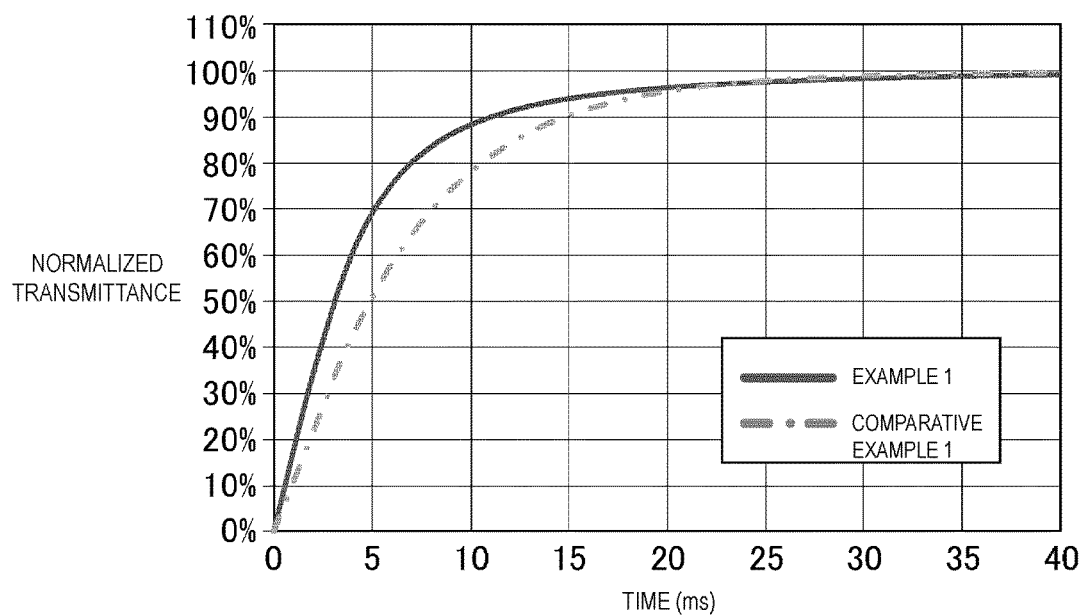
FIG. 13 is a graph illustrating a normalized transmittance to time in rise time in Example 1 and Comparative Example 1.
Figure 14:
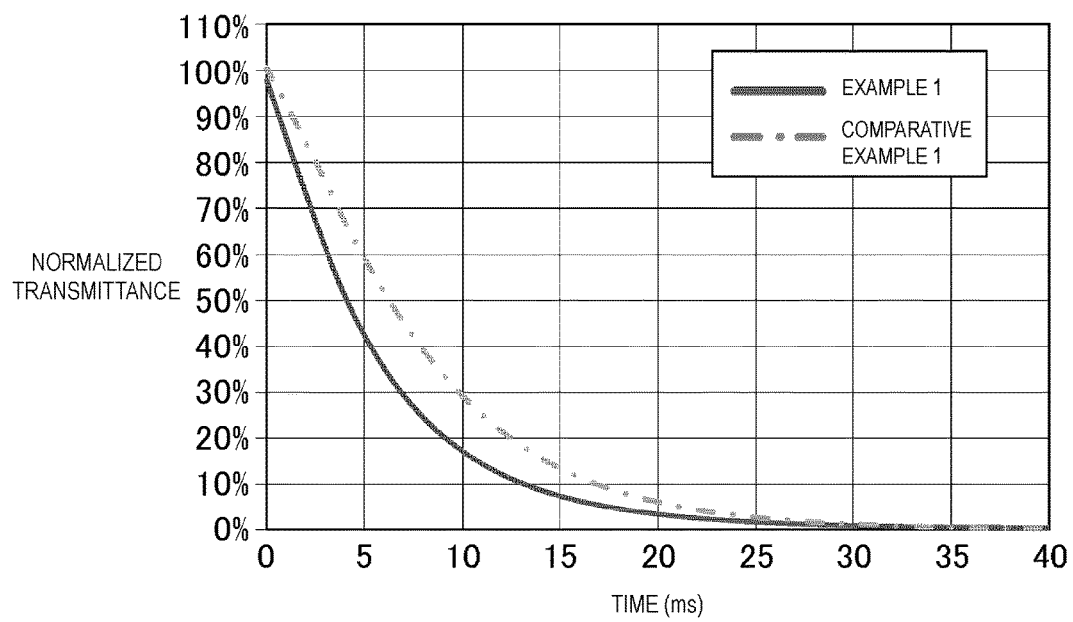
FIG. 14 is a graph illustrating the normalized transmittance to time in fall time in Example 1 and Comparative Example 1.

FIG. 13 is a graph illustrating a normalized transmittance to time in rise time in Example 1 and Comparative Example 1. FIG. 14 is a graph illustrating the normalized transmittance to time in fall time in Example 1 and Comparative Example 1. Note that, Comparative Example 1 relates to a known FFS-mode liquid crystal display device, and the configuration will be described later.

Table 2 below indicates the response time and the transmittance in Example 1 and Comparative Example 1. The item Tr+Td indicates values of Tr+Td, where Tr represents a response time in which the transmittance varies from 10% to 90%, and Td represents a response time in which the transmittance varies from 90% to 10%.

TABLE 2

| | Tr + Td (ms)[*1] | Transmittance (%)[*2] | Tr + Td (ms)/ Transmittance (%) |
|---|---|---|---|
| Example 1 | 22.7 | 34.5 | 0.657 |
| Comparative Example 1 | 29.8 | 34.6 | 0.861 |

[*1]The response time in Example 1 is a value in the first driving scheme.
[*2]The transmittance in Example 1 is a value in the second driving scheme.

FIG. 13 and FIG. 14 represent results of response simulations in Example 1 and Comparative Example 1. It can be seen that both the rise response and the fall response in Example 1 are faster than Comparative Example 1.

As an index to confirm the degree of achievement of both the high-speed response and the high transmittance, values of response time/transmittance were calculated. As such values are smaller, both the high-speed response and the high transmittance are considered to be achieved at the same time.

The values of response time/transmittance in Example 1 are smaller than Comparative Example 1, and therefore Example 1 is more useful than Comparative Example 1, as the driving that achieves both the high-speed response and the high transmittance at the same time.

Examples 2 to 9

Figure 15:
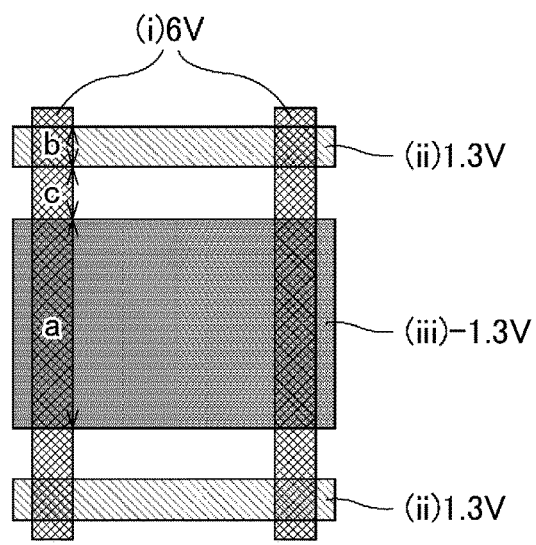
FIG. 15 is a schematic plan view illustrating the voltage supplied to each of the electrodes in white display of the first driving scheme in Examples 2 to 9.

FIG. 15 is a schematic plan view illustrating the voltage supplied to each of the electrodes in white display of the first driving scheme in Examples 2 to 9.

In Examples 2 to 9, a value "a" and a value "c" illustrated in FIG. 15 are changed as indicated in the following Table 3 (a value "b" was fixed to 3 µm). All other conditions in Examples 2 to 9 are same in Example 1. Note that, the value "a" illustrated in FIG. 1.5 indicates a length of a part, in at least one contour line of the plurality of linear portions of the upper layer electrode (i), intersecting with the branch portion of the lower layer electrode (iii). Additionally, the value "b" illustrated in FIG. 15 indicates a length of a part, in at least one contour line of the plurality of linear portions of the upper layer electrode (i), intersecting with the branch portion of the lower layer electrode (ii).

As for the confirmation of advantageous effects in Examples 2 to 9, the simulations were carried out by using an LCD-Master3D manufactured by Shintech, Inc. The simulation result in Comparative Example 1 is also used in Table 5.

Table 4 represents the transmittance in white display in the first driving scheme and the second driving scheme in Examples 2 to 9. In each of Examples, it can be seen that the transmittance in the second driving scheme is higher than the transmittance in the first driving scheme.

Table 5 represents the response time and the transmittance in Examples 2 to 9 and Comparative Example 1.

The item Tr+Td indicates values of Tr+Td, where Tr represents a response time in which the transmittance varies from 10% to 90%, and Td represents a response time in which the transmittance varies from 90% to 10%.

Additionally, as an index to confirm the degree of achievement in both the high-speed response and the high transmittance, values of response time/transmittance were calculated. As such values are smaller, both the high-speed response and the high transmittance are considered to be achieved at the same time.

As illustrated in Table 5, the values of response time/transmittance in Examples 2 to 9 are smaller than Comparative Example 1, and therefore Examples 2 to 9 are more useful than Comparative Example 1, as the driving that achieves both the high-speed response and the high transmittance at the same time.

TABLE 3

|   | Example 2 | Example 3 | Example 4 | Example 5 | Example 6 | Example 7 | Example 8 | Example 9 |
|---|---|---|---|---|---|---|---|---|
| a (μm) | 5.5 | 6 | 10 | 12 | 13 | 8 | 8 | 8 |
| c (μm) | 3.5 | 3.5 | 3.5 | 3.5 | 3.5 | 2.5 | 3 | 4.5 |

TABLE 4

|  | Transmittance (%) | |
|---|---|---|
|  | First Driving Scheme | Second Driving Scheme |
| Example 2 | 24.6 | 34.5 |
| Example 3 | 25.7 | 34.5 |
| Example 4 | 24.3 | 34.6 |
| Example 5 | 24.7 | 34.7 |
| Example 6 | 22.8 | 34.8 |
| Example 7 | 22.2 | 35.4 |
| Example 8 | 24.5 | 35.0 |
| Example 9 | 24.7 | 33.5 |

TABLE 5

|  | Tr + Td (ms)*[1] | Transmittance (%)*[2] | Tr + Td (ms)/ Transmittance (%) |
|---|---|---|---|
| Example 2 | 28.6 | 34.5 | 0.828 |
| Example 3 | 27.2 | 34.5 | 0.789 |
| Example 4 | 23.9 | 34.6 | 0.691 |
| Example 5 | 27.9 | 34.7 | 0.805 |
| Example 6 | 29.5 | 34.8 | 0.849 |
| Example 7 | 21.2 | 35.4 | 0.598 |
| Example 8 | 21.5 | 35.0 | 0.615 |
| Example 9 | 27.3 | 33.5 | 0.816 |
| Comparative Example 1 | 29.8 | 35.0 | 0.861 |

*[1]The response times in Examples 2 to 9 are values in the first driving scheme.
*[2]The transmittances in Examples 2 to 9 are values in the second driving scheme.

Figure 16:
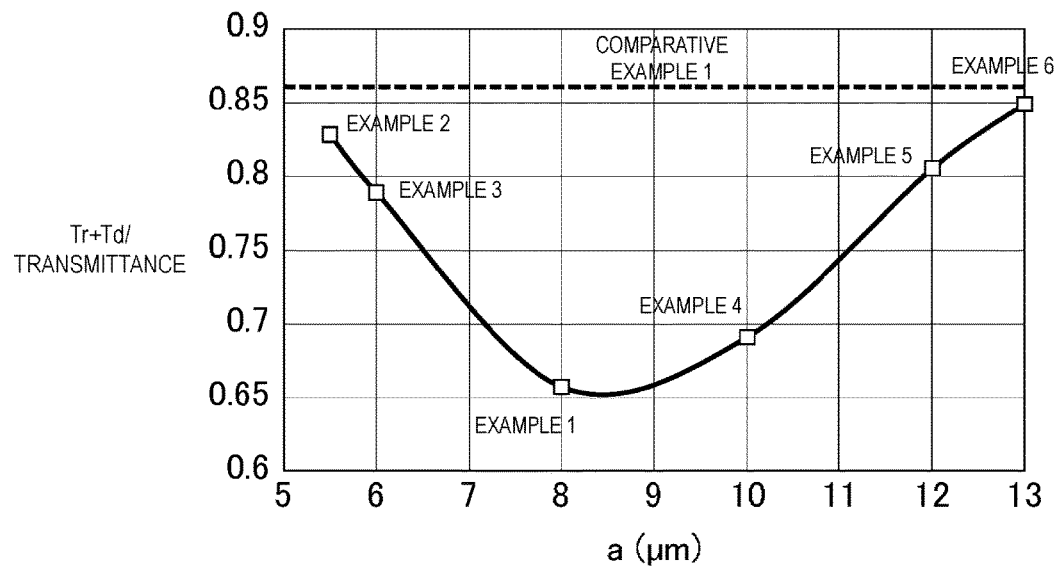
FIG. 16 is a graph illustrating Tr+Td (ms)/transmittance (%) with respect to an average width "a" (μm) of the third electrode in Examples 1 to 6 and Comparative Example 1.
Figure 17:
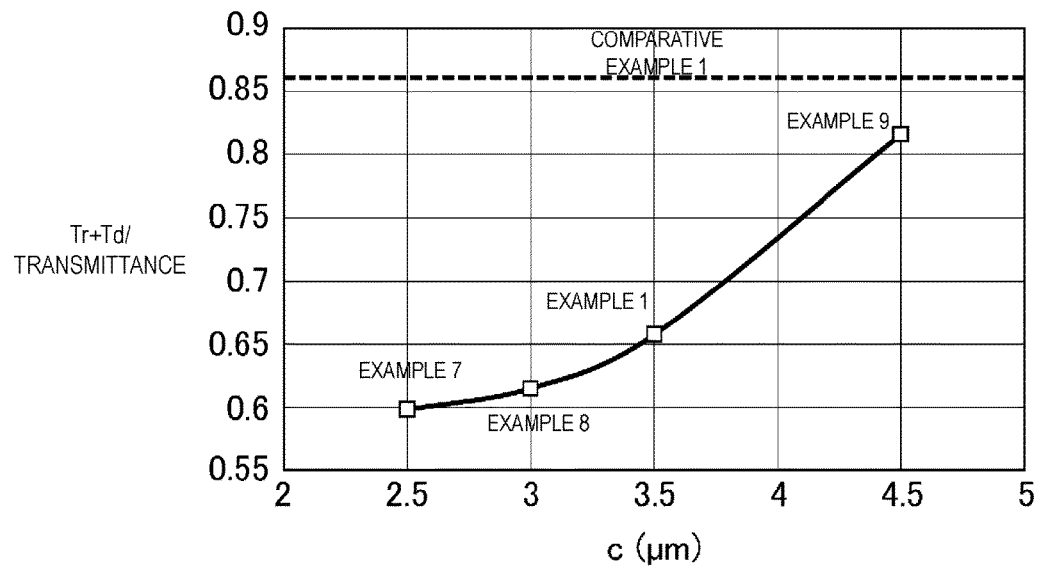
FIG. 17 is a graph illustrating Tr+Td (ms)/transmittance (%) with respect to an average space "c" (μm) between the second electrode and the third electrode in Examples 1 and 7 to 9 and Comparative Example 1.
Figure 18:
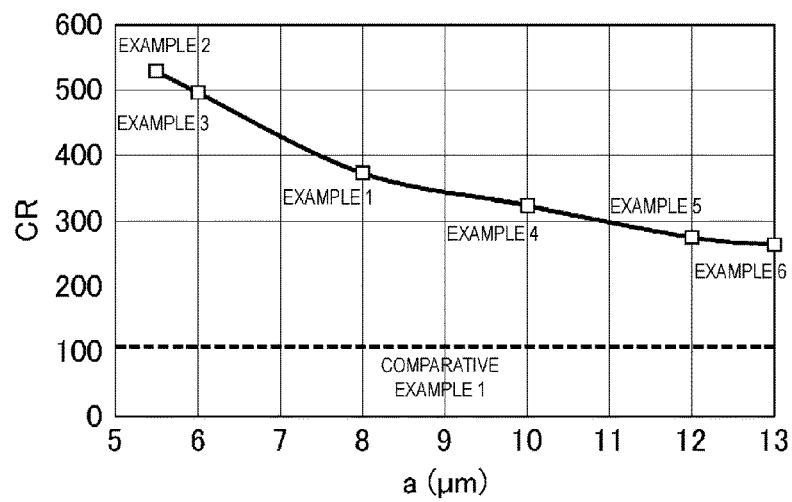
FIG. 18 is a graph illustrating a contrast ratio with respect to the average width "a" (μm) of the third electrode in Examples 1 to 6 and Comparative Example 1.
Figure 19:
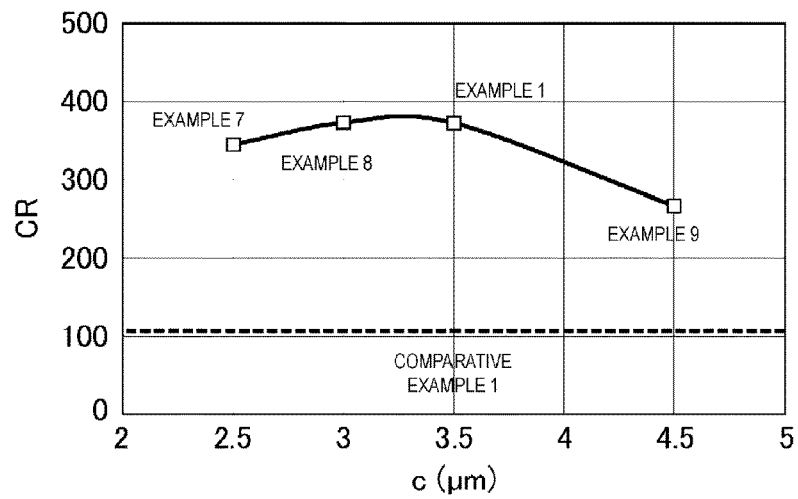
FIG. 19 is a graph illustrating the contrast ratio to the average space "c" (μm) between the second electrode and the third electrode in Examples 1 and 7 to 9 and Comparative Example 1.

FIG. 16 is a graph representing Tr+Td (ms)/transmittance (%) with respect to an average width "a" (μm) of the third electrode in Examples 1 to 6 and Comparative Example 1. FIG. 17 is a graph representing Tr+Td (ms)/transmittance (%) with respect to an average space "c" (μm) between the second electrode and the third electrode in Examples 1 and 7 to 9 and Comparative Example 1. FIG. 18 is a graph representing the contrast ratio with respect to the average width "a" (μm) of the third electrode in Examples 1 to 6 and Comparative Example 1. FIG. 19 is a graph representing the contrast ratio with respect to the average space "c" (μm) between the second electrode and the third electrode in Examples 1 and 7 to 9 and Comparative Example 1. Note that, in FIG. 16 and FIG. 17, the smaller the value of Tr+Td (ms)/transmittance (%), the better. Additionally, in FIG. 18 and FIG. 19, the larger the contrast ratio (CR), the better.

FIG. 16 to FIG. 18 represent graphs into which the values of the above tables are plotted.

From a relationship between the value "a", and the value of Tr+Td/transmittance and the contrast ratio, a range of the value "a", in which the structure proposed in the present invention exhibits superior performance, is 5.5 μm≤a≤13 μm.

Additionally, since the value "b" is fixed to 3 μm, a range of a value "a-b", in which superior performance is exhibited, can be 2.5 μm≤a-b≤10 μm.

From a relationship between the value "c", and the value of Tr+Td/transmittance and the contrast ratio, a range of the value "c", in which the structure proposed in the present invention exhibits superior performance, is 2.5 μm≤c≤4.5 μm.

Since the value "c" is desirably 2.5 μm or greater for manufacturing reasons such as the yield and the like, the value "c" was set to 2.5 μm or greater.

Although the smaller the value "b" is, the better the characteristics become, the value is desirably 2.5 μm or greater, for manufacturing reasons such as the yield and the like, and is desired to be small as much as possible.

Comparative Example 1

Figure 20:
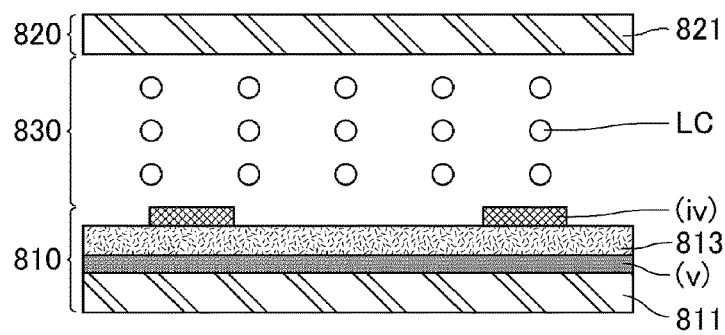
FIG. 20 is a schematic cross-sectional view illustrating an electrode structure and an initial alignment of liquid crystal molecules of a liquid crystal display device in Comparative Example 1.

FIG. 20 is a schematic cross-sectional view illustrating an electrode structure and an initial alignment of liquid crystal molecules of a liquid crystal display device in Comparative Example 1. FIG. 20 is also a schematic cross-sectional view illustrating an example of the electrode structure of a known FFS-mode liquid crystal display device. FIG. 20 illustrates a cross-sectional view taken along a dot-dash line illustrated in FIG. 22, as will be described later.

In Comparative Example 1, a lower layer electrode (v) in a lower substrate 810 including a glass substrate 811 is a planar electrode, and an upper layer electrode (iv) serving as a slit electrode is arranged with an insulating layer 813 interposed between the lower layer electrode (v) and the upper layer electrode (iv). Note that, a pair of comb-shaped electrodes may be used in the upper layer electrode (iv) of the lower substrate, instead of the slit electrode. No electrode is arranged for liquid crystal control, in an upper substrate 820 including a glass substrate 821.

Horizontal alignment films (not illustrated) were provided in the upper and lower substrates on the liquid crystal layer 830 side, and the liquid crystal molecules were horizontally aligned such that an angle of orientation became 5 degrees with respect to an extension direction of linear portions of the upper layer electrode (iv) when no voltage was supplied. Additionally, polarizing plates (not illustrated) were provided on the upper and lower substrates on the opposite side to the liquid crystal layer side. As such polarizing plates, linear polarizing plates were employed and provided in cross Nicol arrangement, in which the polarization axes of the polarizing plates in the upper and lower substrates were vertical to or parallel with long axes of the liquid crystal molecules, when no voltage was supplied, so that a liquid crystal display device in a normally black mode was configured. Additionally, the liquid crystal material and the thickness in Comparative Example 1 were same with those of Example 1. In the upper layer electrode (iv), the electrode width of the linear portions is 3 μm, and the electrode space between adjacent linear portions is 6 μm. The dielectric constant s of the insulating layer 813 is 6.9. Note that, other configurations, such as an alignment film material, an alignment film treatment method, an insulating layer material, and the like, for example, of the liquid crystal display device in Comparative Example 1 are same as the liquid crystal display device in Example 1 as described above.

In Comparative Example 1, switching in rise time is performed by generating the fringe electric field between the upper layer electrode (iv) and the lower layer electrode (v) of the lower substrate, and rotating the liquid crystal molecules in or near the lower substrate in the same direction in the horizontal plane. Additionally, the switching in fall time is performed by weakening the fringe electric field or making the fringe electric field zero, and returning the liquid crystal molecules to the original alignment state by the viscoelasticity.

However, in the liquid crystal layer, there is a region where the electric field for rotating the liquid crystal molecules is weak, and hence time is needed for causing the liquid crystal molecules to rotate in such a region. Furthermore, in this situation, since the liquid crystal molecules rotate in the same direction, strain in the horizontal plane caused by elastic deformation of the liquid crystal is small. Accordingly, when switching is performed in fall time by weakening the electric field or making the electric field zero, restoring force caused by the elastic strain acting for returning to the original alignment state is small and the response is slow. Therefore, in both switching in rise time and switching in fall time, the response times are slow.

Figure 21:
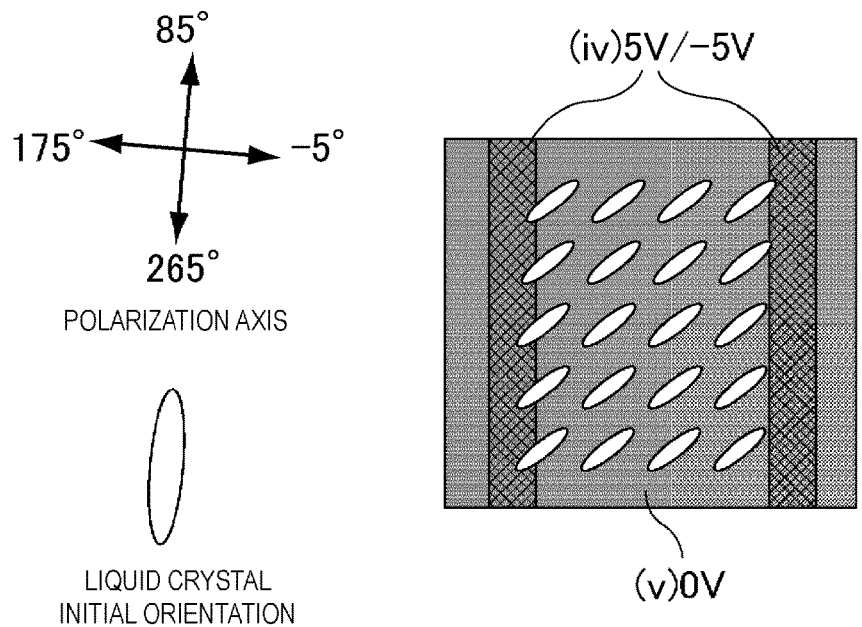
FIG. 21 is a schematic plan view illustrating the voltage supplied to each of the electrodes and the alignment of the liquid crystal molecules in white display of the liquid crystal display device in Comparative Example 1.
Figure 22:
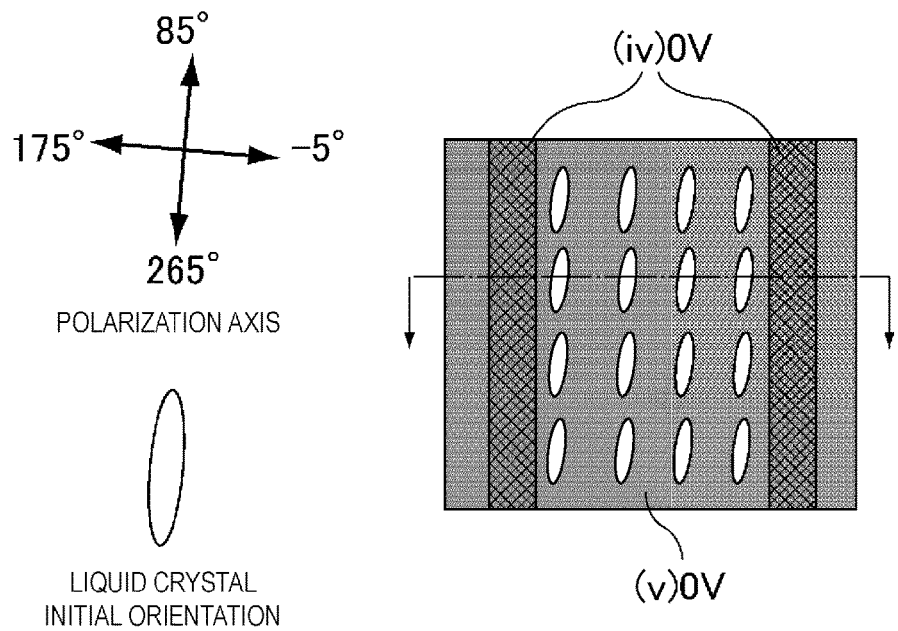
FIG. 22 is a schematic plan view illustrating the voltage supplied to each of the electrodes and the alignment of the liquid crystal molecules in black display of the liquid crystal display device in Comparative Example 1.

FIG. 21 is a schematic plan view illustrating the voltage supplied to each of the electrodes and the alignment of the liquid crystal molecules in white display of the liquid crystal display device in Comparative Example 1. FIG. 22 is a schematic plan view illustrating the voltage supplied to each of the electrodes and the alignment of the liquid crystal molecules in black display of the liquid crystal display device in Comparative Example 1. FIG. 21 and FIG. 22 illustrate a principle in Comparative Example 1 when voltages are supplied.

In an initial alignment, as described above, an angle of the liquid crystal molecules is determined in a direction forming an angle of 5 degrees with an extension direction of the linear portions of the upper layer electrode (iv) serving as a pixel electrode.

First, operations of the liquid crystal molecules in rise time will be described in detail.

When a voltage is supplied to the upper layer electrode (iv), a fringe electric field is generated between the upper layer electrode (iv) and the lower layer electrode (v). At this time, the liquid crystal rotates to move away from the alignment orientation axis, and optically modulates from black display to white display. In the present Comparative Example, a voltage of 5 V is supplied to the upper layer electrode (iv) while inverting the polarity in white gray-scale display.

Next, operations of the liquid crystal molecules in fall time will be described.

The fringe electric field disappears by turning the voltage off, and the liquid crystal molecules being elastic bodies rotate toward the initial alignment orientation (anchoring) by the restoring force thereof. The alignment film required for the alignment control of the liquid crystal, the alignment method, and the insulating layer are the same as those described in Example 1.

Comparative Example 2

A liquid crystal display device in Comparative Example 2 includes, in the lower substrate, as illustrated in the drawings which will be described later, an upper layer electrode (i), a lower layer electrode (ii), and a lower layer electrode (iii) provided in the same layer as that of the lower layer electrode (ii).

The upper layer electrode (i) includes a plurality of linear portions, when the lower substrate is viewed in a plan view. The plurality of linear portions are substantially parallel with one another, and slits substantially parallel with one another are provided between the respective linear portions.

A lower layer electrode (ii) and a lower layer electrode (iii) are each configured with a trunk portion and branch portions extending from the trunk portion, when the lower substrate is viewed in a plan view. The branch portions include a plurality of linear electrode portions which are substantially parallel with one another.

An extension direction of the branch portions of the lower layer electrode (ii) and the lower layer electrode (iii) is set to a direction forming 90 degrees with an extension direction of the linear portions of the upper layer electrode (i). Additionally, in the upper layer electrode (i), an electrode width of the linear portion is 3 μm, and an electrode space between adjacent linear portions is 6 μm. In the branch portion of a pair of comb-shaped electrodes configured with the lower layer electrode (ii) and the lower layer electrode (iii), an electrode width of the linear portion is 3 μm, and an electrode space between adjacent linear portions is 3 μm.

Hereinafter, a driving method of the liquid crystal using the liquid crystal display device in Comparative Example 2 will be described.

In Comparative Example 2, high-response driving is achieved. Additionally, by switching a voltage supplying method, two types of driving schemes including driving capable of performing a high-speed response and driving achieving a higher transmittance than the above driving with the same configuration are achieved. In the same manner as Example 1, the driving which achieves the high-speed response is referred to as a first driving scheme, and the driving which achieves a higher transmittance than that is referred to as a second driving scheme.

Figure 23:
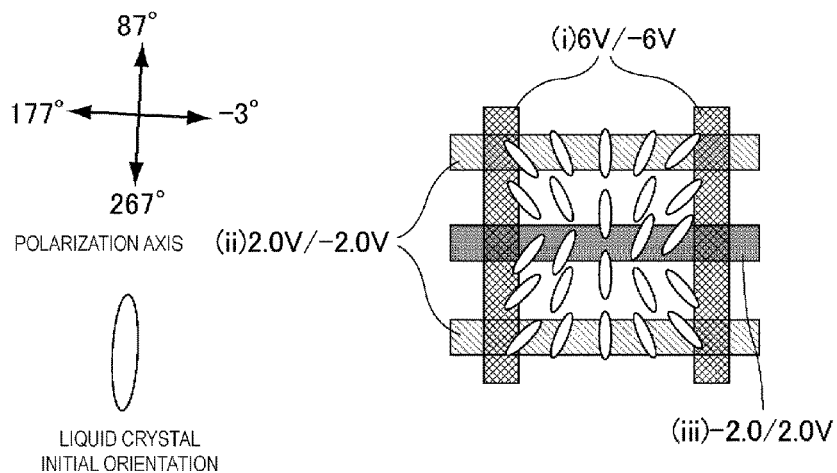
FIG. 23 is a schematic plan view illustrating the voltage supplied to each of the electrodes and the alignment of the liquid crystal molecules in white display of a first driving scheme in Comparative Example 2.
Figure 24:
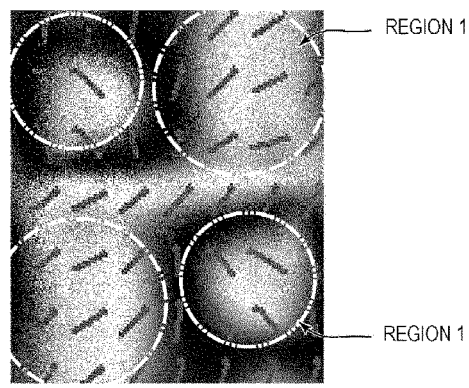
FIG. 24 is a simulation result illustrating a director distribution and a transmittance distribution corresponding to FIG. 23.
Figure 25:
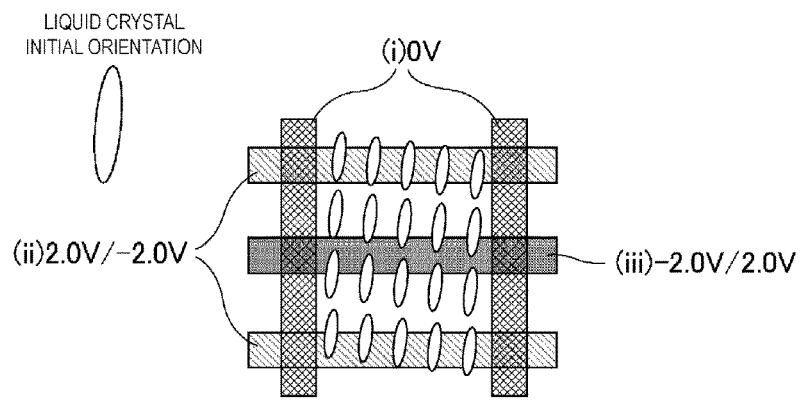
FIG. 25 is a schematic plan view illustrating the voltage supplied to each of the electrodes and the alignment of the liquid crystal molecules in black display of the first driving scheme in Comparative Example 2.
Figure 26:
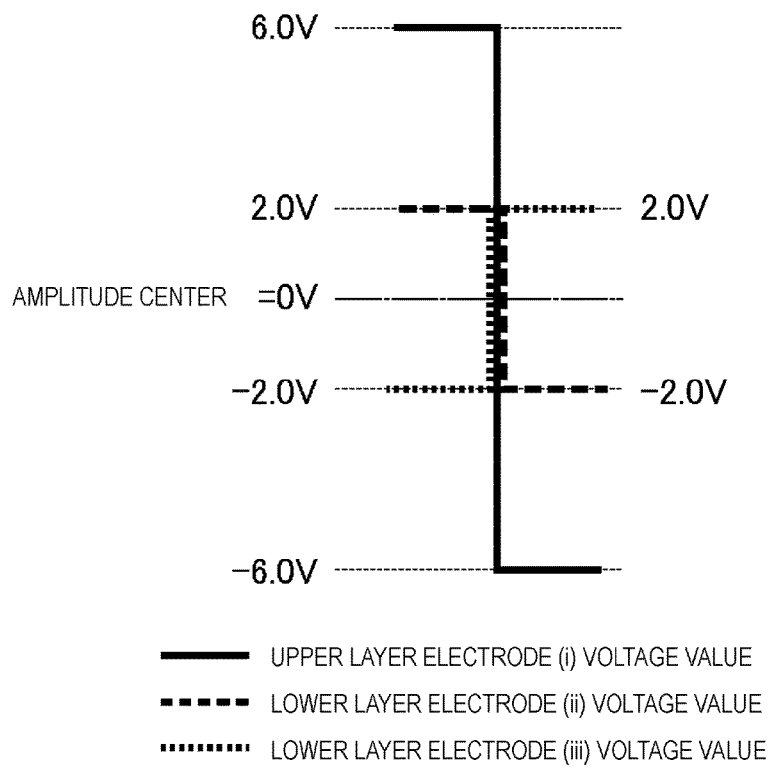
FIG. 26 is a voltage relation diagram illustrating the voltage supplied to each of the electrodes in white display of the first driving scheme in Comparative Example 2.

FIG. 23 is a schematic plan view illustrating the voltage supplied to each of the electrodes and the alignment of the liquid crystal molecules in white display of the first driving scheme in Comparative Example 2. FIG. 24 is a simulation result illustrating a director distribution and transmittance distribution corresponding to FIG. 23. FIG. 25 is a schematic plan view illustrating the voltage supplied to each of the electrodes and the alignment of the liquid crystal molecules in black display of the first driving scheme in Comparative Example 2. FIG. 26 is a voltage relation diagram illustrating the voltage supplied to each of the electrodes in white display of the first driving scheme in Comparative Example 2. Note that, in the same manner as Example 1, long axes of the liquid crystal molecules form an orientation of 3 degrees to an extension direction of the linear portions of the upper layer electrode (i) when no voltage is supplied.

First, operations of the liquid crystal molecules in rise time will be described in detail.

As illustrated in FIG. 23 and FIG. 26, a transverse electric field is always generated, by constantly supplying voltages to the lower layer electrode (ii) and the lower layer electrode (iii) while inverting the polarities of the voltages with the amplitude center set to 0 V such that the polarities of the electrodes are opposite to each other. Note that, absolute values of the voltages supplied to the lower layer electrode (ii) and the lower layer electrode (iii) are kept constant. Furthermore, by supplying a voltage to the upper layer electrode (i) while inverting the polarity, an electric field, which rotates the liquid crystal molecules in different orientations in the horizontal plane in an alternating manner, is generated, and the liquid crystal molecules are aligned by the electric field to form a bend alignment and a spray alignment in the horizontal plane. In the first driving scheme in Comparative Example 2, in white gray-scale display, a voltage of 6 V/−6 V is supplied to the upper layer electrode (i), a voltage of 2.0 V/−2.0 V is supplied to the lower layer electrode (ii), and a voltage of −2.0 V/2.0 V is supplied to the lower layer electrode (iii).

As can be seen from a transmittance distribution diagram (FIG. 24) obtained by a simulation, the liquid crystal molecules rotate in different orientations between regions 1 surrounded by dot-dash lines and regions 2 surrounded by double-dot-dash lines, and it can be seen that the regions 1 and the regions 2 are present in an alternating manner. In other words, in the first driving scheme, the liquid crystal molecules rotate in the different orientations in the horizontal plane in an alternating manner. As illustrated in FIG. 24, the liquid crystal molecules rotate in the clockwise direction in the horizontal plane in the region 1 (the first region), and the liquid crystal molecules rotate in the counterclockwise direction in the horizontal plane in the region 2 (the second region).

Next, operations of the liquid crystal molecules in fall time will be described.

As illustrated in FIG. 25, by lowering the voltage supplied to the upper layer electrode (i), the liquid crystal molecules respond to the transverse electric field between the lower layer electrode (ii) and the lower layer electrode (iii), and are forcibly rotated toward the initial alignment orientation by the electric field. Additionally, restoring force of the liquid crystal molecules aligned in the bend alignment and the spray alignment in the horizontal plane in white display also acts at the same time to further accelerate the response. In the first driving scheme in Comparative Example 2, the voltage supplied to the upper layer electrode (i) is 0 V, a voltage of 2.0 V/−2.0 V is supplied to the lower layer electrode (ii), and a voltage of −2.0 V/2.0 V is supplied to the lower layer electrode (iii) in black display.

Figure 27:
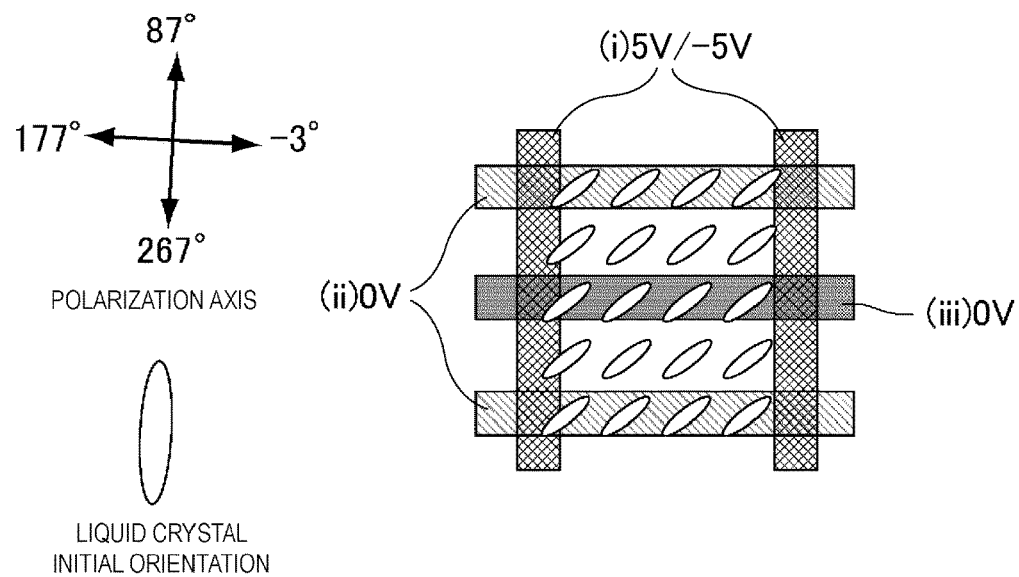
FIG. 27 is a schematic plan view illustrating the voltage supplied to each of the electrodes and the alignment of the liquid crystal molecules in white display of a second driving scheme in Comparative Example 2.
Figure 28:
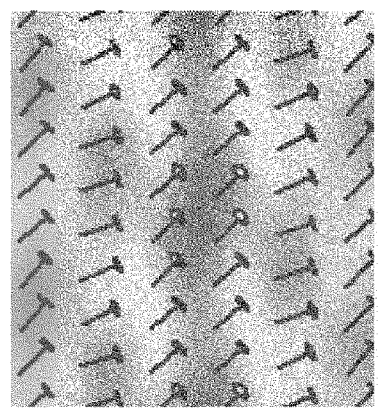
FIG. 28 is a simulation result illustrating a director distribution and a transmittance distribution corresponding to FIG. 27.
Figure 29:
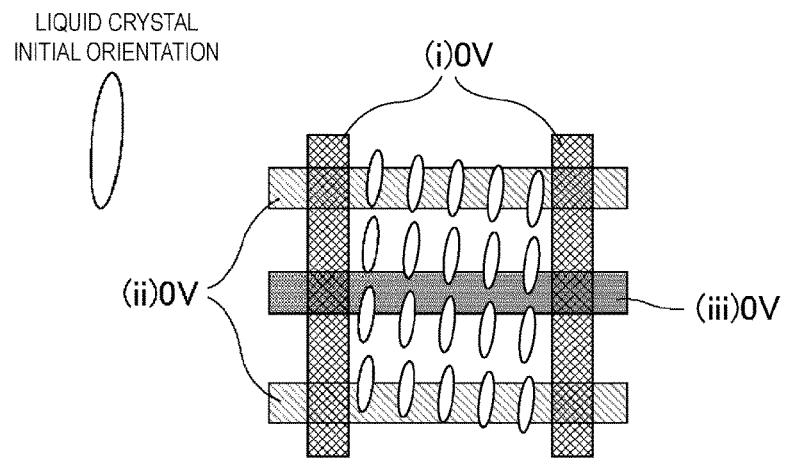
FIG. 29 is a schematic plan view illustrating the voltage supplied to each of the electrodes and the alignment of the liquid crystal molecules in black display of the second driving scheme in Comparative Example 2.

FIG. 27 is a schematic plan view illustrating the voltage supplied to each of the electrodes and the alignment of the liquid crystal molecules in white display of the second driving scheme in Comparative Example 2. FIG. 28 is a simulation result illustrating a director distribution and transmittance distribution corresponding to FIG. 27. FIG. 29 is a schematic plan view illustrating the voltage supplied to each of the electrodes and the alignment of the liquid crystal molecules in black display of the second driving scheme in Comparative Example 2.

First, operations of the liquid crystal molecules in rise time will be described in detail.

As illustrated in FIG. 27, by setting the voltage supplied to both the lower layer electrode (ii) and the lower layer electrode (iii) to 0 V and supplying the voltage to the upper layer electrode (i) while inverting the polarity, a fringe electric field is generated between the upper layer electrode (i), and the lower layer electrode (ii) and the lower layer electrode (iii), and the liquid crystal molecules respond to the electric field and rotate in the same orientation. In the second driving scheme in Comparative Example 2, a voltage of 5 V/−5 V is supplied to the upper layer electrode (i) in white gray-scale display.

As can be seen from a transmittance distribution diagram (FIG. 28) obtained by a simulation, the liquid crystal molecules rotating in the same orientation makes available a higher transmittance than the first driving scheme in Comparative Example 2 as a whole.

Next, operations of the liquid crystal molecules in fall time will be described.

As illustrated in FIG. 29, by turning off the voltage supplied to the upper layer electrode (i), the liquid crystal molecules rotate to return toward an alignment treatment orientation (anchoring) by restoring force. In the second driving scheme in Comparative Example 2, a voltage of 0 V is supplied to the upper layer electrode (i) in black display. The voltages supplied to other respective electrodes (the lower layer electrode (ii) and the lower layer electrode (iii)) are the same with the voltages in white display in the second driving scheme, that is, a voltage of 0 V is supplied.

Other configurations of the liquid crystal display device in Comparative Example 2, except for the above-described configuration, are the same as the configurations of the liquid crystal display device in Example 1 described above.

Table 6 represents a Contrast Ratio (CR) of the first driving scheme in Examples 1 to 9 and Comparative Example 2. It can be seen that the contrasts in Examples 1 to 9 are largely improved with respect to Comparative Example 2 (the reason will be described later). Note that, for example, in the first driving scheme in Example 1, a transmittance in black display is 0.06%, and a transmittance in white display is 24.2%. Additionally, in the first driving scheme in Comparative Example 2, a transmittance in black display is 0.20%, and a transmittance in white display is 21.8%.

TABLE 6

|  | CR |
| --- | --- |
| Example 1 | 372.2 |
| Example 2 | 529 |
| Example 3 | 496 |
| Example 4 | 323 |
| Example 5 | 275 |
| Example 6 | 264 |
| Example 7 | 345 |
| Example 8 | 373 |
| Example 9 | 267 |
| Comparative Example 2 | 107.4 |

Reason why Alignment Stability in Examples 1 to 9 is Improved Compared to Comparative Example 2

Figure 30:
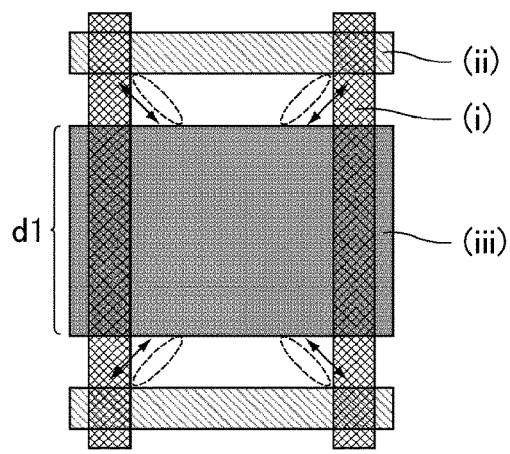
FIG. 30 is a schematic view illustrating an electric field generated in Example 1.
Figure 31:
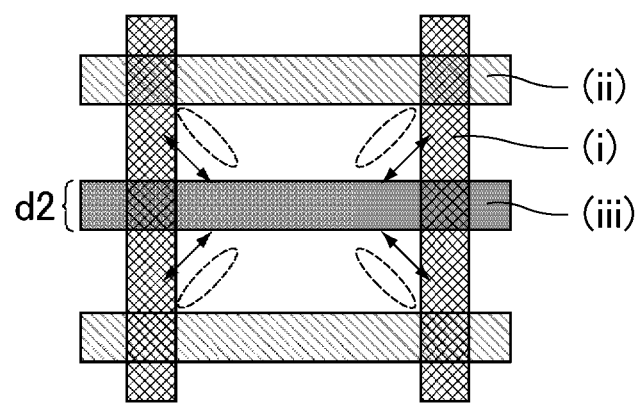
FIG. 31 is a schematic view illustrating an electric field generated in Comparative Example 2.

FIG. 30 is a schematic view illustrating the electric field generated in Example 1. FIG. 31 is a schematic view illustrating the electric field generated in Comparative Example 2.

To stabilize the alignment in the first driving scheme of the liquid crystal display device in Comparative Example 2, the level of the voltages supplied to the lower layer electrodes (ii) and (iii) are desirably at least 2.0 V, but the alignment is stabilized in Examples 1 to 9 even when the voltages supplied to the lower layer electrodes (ii) and (iii) are each 1.3 V. This reason will be described below.

To stabilize the alignment in the first driving scheme in Comparative Example 2, the voltage of 2.0 V is to be supplied to the lower layer electrodes (ii) and (iii), but the alignment is stabilized in Example 1 even when the voltages supplied to the lower layer electrodes (ii) and (iii) are each 1.3 V. As the voltage supplied to the lower layer electrodes (ii) and (iii) is smaller, the more the contrast ratio is improved. Therefore, by reducing the voltages supplied to the lower layer electrodes (ii) and (iii) in Example 1, the contrast ratio is improved by the reduced voltage. This reason will be described below.

In Comparative Example 2, only in and near an intersection point between the upper layer electrode (i) and the lower layer electrode (iii), the electric field that rotates the liquid crystal molecules in a target direction is generated.

Additionally, in Comparative Example 2, as illustrated in FIG. 31, a distance d2, which is between generation sources of the electric field for rotating the liquid crystal molecules in orientations opposite to each other, is short. Accordingly, the alignment of the liquid crystal molecules becomes unstable and easily collapses.

In Example 1, as illustrated in FIG. 30, a distance d1, which is between generation sources of the electric field for rotating the liquid crystal molecules in orientations opposite to each other, is long. Accordingly, the alignment of the liquid crystal molecules is stabilized.

The liquid crystal display devices in Examples described above are each configured to perform a driving operation in which the potential difference between the upper layer electrode (i) and the lower layer electrode (iii) is equal to or larger than the potential difference between the upper layer electrode (i) and the lower layer electrode (ii). The average width of the branch portions of the lower layer electrode (iii) is larger than the average width of the branch portions of the lower layer electrode (ii), the alignment stability of the liquid crystal molecules is improved, the voltages supplied to the lower layer electrodes (ii) and (iii) can be reduced, and thus the contrast ratio is largely improved.

In other words, the liquid crystal display device of the present invention is configured to perform the driving operation in which the potential difference between the upper layer electrode (i) and the lower layer electrode (iii) is equal to or larger than the potential difference between the upper layer electrode (i) and the lower layer electrode (ii), and the average width of the branch portions of the lower layer electrode (iii) is preferably larger than the average width of the branch portions of the lower layer electrode (ii).

Note that, the above-described driving operation in which the potential difference between the first electrode and the third electrode is equal to or larger than the potential difference between the first electrode and the second electrode is usually applied in the first driving scheme. Additionally, as described above, instead of performing the driving operation in which the potential difference between the first electrode and the third electrode is equal to or larger than the potential difference between the first electrode and the second electrode, the driving operation may be performed such that the polarity of the voltage supplied to the first electrode is the same with the polarity of the voltage supplied to the second electrode, and is opposite to the polarity of the voltage supplied to the third electrode.

Additionally, the liquid crystal display devices in Examples described above are capable of achieving a high-speed response that cannot be achieved in the known FFS mode. This is because, in the first driving scheme, the response speed in rise time is accelerated by a strong electric field working on the liquid crystal molecules in the entire horizontal plane due to the transverse electric field applied between the pair of comb-shaped electrodes in the lower layer, and in fall time, the liquid crystal molecules respond to the electric field generated between the lower layer comb-shaped electrodes, in addition to the strong restoring force working such that the in-plane bend and the spray alignments attempt to return to the original state as illustrated in FIG. 4.

Additionally, in the second driving scheme, by making both of the comb-shaped electrodes on the lower side of the two-layer electrodes have the same potential, the fringe field can be generated between the upper-side slit electrode and the lower-side electrodes, and the driving with higher transmittance can be achieved than the driving that achieves electric high-speed response as described above.

It is one characteristic of Examples described above that these two types of driving schemes can be switched depending on the purpose and situation, and a wide viewing angle, a high-speed response, and a high transmittance can be achieved as a result. Note that, the liquid crystal display device in the present invention may be any device capable of performing at least the first driving scheme.

The liquid crystal display devices in Examples described above are enabled to perform the display by appropriately switching the first driving scheme and the second driving scheme. Additionally, in each of the driving schemes, the white display and the black display are appropriately combined for the display in accordance with the desired display.

The liquid crystal display device in the present invention preferably includes a control device that performs the first driving scheme described above, and more preferably includes a control device that switches and performs the first driving scheme and the second driving scheme described above. Therefore, a wide viewing angle, a high-speed response, a high transmittance, and the like are enabled. Accordingly, with one type of electrode configuration, the liquid crystal display device that enables all characteristics of a high-speed response, a wide viewing angle, and a high transmittance is made available.

Additionally, the liquid crystal display device in the present invention preferably includes a control device that automatically switches the first driving scheme and the second driving scheme described above depending on a given condition. The control device preferably includes a temperature sensor, for example, for automatically switching the first driving scheme and the second driving scheme depending on the temperature. For example, the control device is preferably configured to perform the second driving scheme capable of achieving the high transmittance under a temperature environment in which a delay of the response speed is not concerned (for example, a temperature range of −20° C. to 20° C., with which a lower limit falls), and is configured to perform the first driving scheme capable of achieving the high-speed response under a-low-temperature environment in which the response speed becomes slow (for example, a temperature range of −20° C. to 20° C., with which an upper limit falls). Accordingly, desired advantages are achieved in a more appropriate manner.

Furthermore, the liquid crystal display device in the present invention may include a control device for switching the first driving scheme and the second driving scheme described above in accordance with an instruction by a user.

Additionally, in the present invention, a driving method of the liquid crystal display device may use the liquid crystal display device described above.

Additionally, in a case where AC-drive is performed on the liquid crystal in which an AC voltage is supplied to only the electrode included in the lower substrate, as the liquid crystal display device in the present invention, a circuit, a driver, and wiring for the AC-drive may be arranged only in the electrode of the lower substrate as in a typical device. Accordingly, the liquid crystal display device in the present invention achieves a significantly high degree of flexibility in the driving in comparison with a liquid crystal display device in which the circuit, the driver, and the wiring for the AC-drive are arranged in the upper substrate and the lower substrate to perform the AC-drive on the liquid crystal by supplying the AC voltage to the electrode included in the upper substrate and the electrode included in the lower substrate, for example.

Examples of the liquid crystal display device in the present invention include on-vehicle devices such as car navigation systems or the like, electronic books, digital photo frames, industrial equipment, televisions, personal computers, smartphones, tablet terminals, and the like. The present invention is, for example, preferably applied to devices that can be used under a high temperature environment as well as a low temperature environment, such as on-vehicle devices like car navigation systems and the like.

REFERENCE SIGNS LIST (i) Upper layer electrode
(ii) Lower layer electrode
(iii) Lower layer electrode
(iv) Upper layer electrode
(v) Lower layer electrode
CH Contact hole
TFT Thin film transistor element
SL Source bus line
GL Gate bus line
LC Liquid crystal molecule
10, 810 Lower substrate
11, 21, 811, 821 Glass substrate
13, 813 Insulating layer
20, 820 Upper substrate
30, 830 Liquid crystal layer

The invention claimed is:

1. A liquid crystal display device comprising:
an upper substrate and a lower substrate; and
a liquid crystal layer held between the upper substrate and the lower substrate,
wherein the liquid crystal layer includes liquid crystal molecules horizontally aligned with respect to main surfaces of the upper substrate and the lower substrate when no voltage is supplied,
the lower substrate includes a first electrode, a second electrode in a different layer from a layer of the first electrode, and a third electrode in a different layer from the layer of the first electrode,
the first electrode includes a plurality of linear portions,
the second electrode and the third electrode configure a pair of electrodes each having a comb shape,
each of the pair of electrodes each having a comb shape includes a trunk portion and a plurality of branch portions to be branched from the trunk portion,
when viewed in a plan view, at least one contour line of the plurality of linear portions of the first electrode intersects with one of the branch portions of the second electrode and one of the branch portions of the third electrode, the one of the branch portions of the second electrode and the one of the branch portions of the third electrode being adjacent to each other, and an average width of the branch portions of the third electrode is larger than an average width of the branch portions of the second electrode, and
the liquid crystal display device is configured to perform a driving operation for making a potential difference between the first electrode and the third electrode equal to or greater than a potential difference between the first electrode and the second electrode.

2. The liquid crystal display device according to claim 1, wherein the average width of the branch portions of the third electrode is from 5.5 μm to 13 μm.

3. The liquid crystal display device according to claim 1, wherein the average width of the branch portions of the third electrode is larger than the average width of the branch portions of the second electrode by 2.5 μm or greater.

4. The liquid crystal display device according to claim 1, wherein an average space between the branch portions of the second electrode and the branch portions of the third electrode is from 2.5 μm to 4.5 μm.

5. The liquid crystal display device according to claim 1, wherein in the driving operation, an electric field is generated by the electrodes included in the lower substrate, such that one part of the liquid crystal molecules are rotated in a horizontal plane with respect to the main surfaces of the upper substrate and the lower substrate, and another part of the liquid crystal molecules are rotated in an opposite direction to a direction of the part of the liquid crystal molecules in the horizontal plane with respect to the main surfaces.

6. The liquid crystal display device according to claim 5, wherein in the driving operation, the electric field is generated by the electrodes included in the lower substrate, such that at least two first regions and at least two second regions are arranged in a pixel in an alternating manner, one part of the liquid crystal molecules being rotated in the horizontal plane with respect to the main surfaces in the first region, and another part of the liquid crystal molecules being rotated in an opposite direction to a direction of the one part of the liquid crystal molecules in the horizontal plane, with respect to the main surfaces in the second region.

7. The liquid crystal display device according to claim 1, wherein the liquid crystal display device is configured to perform, in a switching manner,
a first driving scheme configured to perform the driving operation, and
a second driving scheme configured to perform a driving operation to generate an electric field to by the electrodes, the electric field rotating the liquid crystal molecules in one direction in the horizontal plane with respect to the main surfaces of the upper substrate and the lower substrate.

8. The liquid crystal display device according to claim 1, wherein the first electrode is arranged closer to the liquid crystal layer side than to the second electrode and the third electrode.

9. The liquid crystal display device according to claim 1, wherein the liquid crystal molecules include positive anisotropy of dielectric constant.

10. The liquid crystal display device according to claim 1, wherein the lower substrate includes a thin film transistor element, and the thin film transistor element includes an oxide semiconductor.

* * * * *